US009912612B2

(12) United States Patent
Sabaa et al.

(10) Patent No.: US 9,912,612 B2
(45) Date of Patent: *Mar. 6, 2018

(54) EXTENDED ETHERNET FABRIC SWITCHES

(71) Applicant: BROCADE COMMUNICATIONS SYSTEMS, INC., San Jose, CA (US)

(72) Inventors: Amr Sabaa, Sunnyvale, CA (US); Muhammad Durrani, Sunnyvale, CA (US); Mukhtiar Shaikh, San Jose, CA (US); Prasad P. Jogalekar, San Jose, CA (US); Jayanthi Jayaraman, San Jose, CA (US); Arunkaruppaiya Adaikalam, Milpitas, CA (US)

(73) Assignee: BROCADE COMMUNICATIONS SYSTEMS LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/488,173

(22) Filed: Sep. 16, 2014

(65) Prior Publication Data

US 2015/0117256 A1 Apr. 30, 2015

Related U.S. Application Data

(60) Provisional application No. 61/896,544, filed on Oct. 28, 2013.

(51) Int. Cl.
H04L 12/28 (2006.01)
H04L 12/933 (2013.01)
(Continued)

(52) U.S. Cl.
CPC .......... H04L 49/15 (2013.01); H04L 12/4633 (2013.01); H04L 41/12 (2013.01);
(Continued)

(58) Field of Classification Search
CPC ..... H04L 12/462; H04L 45/66; H04L 49/351; H04L 49/354
See application file for complete search history.

(56) References Cited

U.S. PATENT DOCUMENTS 829,529 A 8/1906 Keathley
5,390,173 A 2/1995 Spinney
(Continued)

FOREIGN PATENT DOCUMENTS

CN 1735062 2/2006
CN 1777149 5/2006
(Continued)

OTHER PUBLICATIONS

Mahalingam "VXLAN: A Framework for Overlaying Virtualized Layer 2 Networks over Layer 3 Networks" Oct. 17, 2013 pp. 1-22, Sections 1, 4 and 4.1.
(Continued)

Primary Examiner — Asad Nawaz
Assistant Examiner — Berhanu Belete
(74) Attorney, Agent, or Firm — Shun Yao; Park, Vaughan, Fleming & Dowler LLP

(57) ABSTRACT

One embodiment of the present invention provides a switch. The switch includes a fabric switch module and a learning module. The fabric switch module maintains a membership in a first fabric switch. A fabric switch includes a plurality of switches and operates as a single switch. The first fabric switch is in an extended fabric switch which further comprises a second fabric switch. The learning module identifies from a notification message from the second fabric switch a media access control (MAC) address learned at the second fabric switch. The learning module stores the MAC address in a local MAC table in association with an Internet Protocol (IP) address of the second fabric switch.

24 Claims, 17 Drawing Sheets

(51) Int. Cl.
  *H04L 12/46* (2006.01)
  *H04L 12/24* (2006.01)
  *H04L 12/721* (2013.01)
  *H04L 12/751* (2013.01)

(52) U.S. Cl.
  CPC .............. *H04L 45/02* (2013.01); *H04L 45/66*
    (2013.01); *H04L 45/68* (2013.01); *H04L*
    *2212/00* (2013.01)

(56) References Cited

U.S. PATENT DOCUMENTS

| | | | |
|---|---|---|---|
| 5,802,278 A | 9/1998 | Isfeld | |
| 5,878,232 A | 3/1999 | Marimuthu | |
| 5,879,173 A | 3/1999 | Poplawski | |
| 5,959,968 A | 9/1999 | Chin | |
| 5,973,278 A | 10/1999 | Wehrill, III | |
| 5,983,278 A | 11/1999 | Chong | |
| 5,995,262 A | 11/1999 | Hirota | |
| 6,041,042 A | 3/2000 | Bussiere | |
| 6,085,238 A | 7/2000 | Yuasa | |
| 6,092,062 A | 7/2000 | Lohman | |
| 6,104,696 A | 8/2000 | Kadambi | |
| 6,185,214 B1 | 2/2001 | Schwartz | |
| 6,185,241 B1 | 2/2001 | Sun | |
| 6,295,527 B1 | 9/2001 | McCormack | |
| 6,331,983 B1 | 12/2001 | Haggerty | |
| 6,438,106 B1 | 8/2002 | Pillar | |
| 6,498,781 B1 | 12/2002 | Bass | |
| 6,542,266 B1 | 4/2003 | Phillips | |
| 6,553,029 B1 | 4/2003 | Alexander | |
| 6,571,355 B1 | 5/2003 | Linnell | |
| 6,583,902 B1 | 6/2003 | Yuen | |
| 6,633,761 B1 | 10/2003 | Singhal | |
| 6,636,963 B1 | 10/2003 | Stein | |
| 6,771,610 B1 | 8/2004 | Seaman | |
| 6,870,840 B1 | 3/2005 | Hill | |
| 6,873,602 B1 | 3/2005 | Ambe | |
| 6,920,503 B1 | 7/2005 | Nanji | |
| 6,937,576 B1 | 8/2005 | DiBenedetto | |
| 6,956,824 B2 | 10/2005 | Mark | |
| 6,957,269 B2 | 10/2005 | Williams | |
| 6,975,581 B1 | 12/2005 | Medina | |
| 6,975,864 B2 | 12/2005 | Singhal | |
| 7,016,352 B1 | 3/2006 | Chow | |
| 7,061,877 B1 | 6/2006 | Gummalla | |
| 7,062,177 B1 | 6/2006 | Grivna | |
| 7,097,308 B2 | 8/2006 | Kim et al. | |
| 7,173,934 B2 | 2/2007 | Lapuh | |
| 7,197,308 B2 | 3/2007 | Singhal | |
| 7,206,288 B2 | 4/2007 | Cometto | |
| 7,310,664 B1 | 12/2007 | Merchant | |
| 7,313,637 B2 | 12/2007 | Tanaka | |
| 7,315,545 B1 | 1/2008 | Chowdhury et al. | |
| 7,316,031 B2 | 1/2008 | Griffith | |
| 7,330,897 B2 | 2/2008 | Baldwin | |
| 7,380,025 B1 | 5/2008 | Riggins | |
| 7,397,768 B1 | 7/2008 | Betker | |
| 7,397,794 B1 | 7/2008 | Lacroute | |
| 7,430,164 B2 | 9/2008 | Bare | |
| 7,453,888 B2 | 11/2008 | Zabihi | |
| 7,477,894 B1 | 1/2009 | Sinha | |
| 7,480,258 B1 | 1/2009 | Shuen | |
| 7,508,757 B2 | 3/2009 | Ge | |
| 7,558,195 B1 | 7/2009 | Kuo | |
| 7,558,273 B1 | 7/2009 | Grosser | |
| 7,559,901 B2 | 7/2009 | Maile et al. | |
| 7,571,447 B2 | 8/2009 | Ally | |
| 7,599,901 B2 | 10/2009 | Mital | |
| 7,653,056 B1 | 1/2010 | Dianes | |
| 7,688,736 B1 | 3/2010 | Walsh | |
| 7,688,960 B1 | 3/2010 | Aubuchon | |
| 7,690,040 B2 | 3/2010 | Frattura | |
| 7,706,255 B1 | 4/2010 | Kondrat et al. | |
| 7,716,370 B1 | 5/2010 | Devarapalli | |
| 7,720,076 B2 | 5/2010 | Dobbins | |
| 7,729,296 B1 | 6/2010 | Choudhary | |
| 7,787,480 B1* | 8/2010 | Mehta et al. | 370/401 |
| 7,792,920 B2 | 9/2010 | Istvan | |
| 7,796,593 B1 | 9/2010 | Ghosh | |
| 7,801,021 B1 | 9/2010 | Triantafillis | |
| 7,808,992 B2 | 10/2010 | Homchaudhuri | |
| 7,836,332 B2 | 11/2010 | Hara | |
| 7,843,906 B1 | 11/2010 | Chidambaram et al. | |
| 7,843,907 B1 | 11/2010 | Abou-Emara | |
| 7,860,097 B1 | 12/2010 | Lovett | |
| 7,898,959 B1 | 3/2011 | Arad | |
| 7,912,091 B1 | 3/2011 | Krishnan | |
| 7,924,837 B1 | 4/2011 | Shabtay | |
| 7,937,438 B1 | 5/2011 | Miller | |
| 7,937,756 B2 | 5/2011 | Kay | |
| 7,945,941 B2 | 5/2011 | Sinha | |
| 7,949,638 B1 | 5/2011 | Goodson | |
| 7,957,386 B1 | 6/2011 | Aggarwal | |
| 8,018,938 B1 | 9/2011 | Fromm | |
| 8,027,354 B1 | 9/2011 | Portolani | |
| 8,054,832 B1 | 11/2011 | Shukla | |
| 8,068,442 B1 | 11/2011 | Kompella | |
| 8,078,704 B2 | 12/2011 | Lee | |
| 8,090,805 B1 | 1/2012 | Chawla | |
| 8,102,781 B2 | 1/2012 | Smith | |
| 8,102,791 B2 | 1/2012 | Smith | |
| 8,116,307 B1 | 2/2012 | Thesayi | |
| 8,125,928 B2 | 2/2012 | Mehta | |
| 8,134,922 B2 | 3/2012 | Elangovan | |
| 8,155,150 B1 | 4/2012 | Chung | |
| 8,160,063 B2 | 4/2012 | Maltz | |
| 8,160,080 B1 | 4/2012 | Arad | |
| 8,170,038 B2 | 5/2012 | Belanger | |
| 8,175,107 B1 | 5/2012 | Yalagandula | |
| 8,095,774 B1 | 6/2012 | Lambeth | |
| 8,194,674 B1 | 6/2012 | Pagel | |
| 8,195,774 B2 | 6/2012 | Lambeth | |
| 8,204,061 B1 | 6/2012 | Sane | |
| 8,213,313 B1 | 7/2012 | Doiron | |
| 8,213,336 B2 | 7/2012 | Smith | |
| 8,230,069 B2 | 7/2012 | Korupolu | |
| 8,239,960 B2 | 8/2012 | Frattura | |
| 8,249,069 B2 | 8/2012 | Raman | |
| 8,270,401 B1 | 9/2012 | Barnes | |
| 8,295,291 B1 | 10/2012 | Ramanathan | |
| 8,295,921 B2 | 10/2012 | Wang | |
| 8,301,686 B1 | 10/2012 | Appajodu | |
| 8,339,994 B2 | 12/2012 | Gnanasekaran | |
| 8,351,352 B1 | 1/2013 | Eastlake | |
| 8,369,335 B2 | 2/2013 | Jha | |
| 8,369,347 B2 | 2/2013 | Xiong | |
| 8,392,496 B2 | 3/2013 | Linden | |
| 8,451,717 B2 | 5/2013 | Srikrishnan | |
| 8,462,774 B2 | 6/2013 | Page | |
| 8,465,774 B2 | 6/2013 | Page | |
| 8,467,375 B2 | 6/2013 | Blair | |
| 8,520,595 B2 | 8/2013 | Yadav | |
| 8,553,710 B1 | 10/2013 | White | |
| 8,595,479 B2* | 11/2013 | Radhakrishnan | H04L 63/0272 713/153 |
| 8,599,850 B2 | 12/2013 | Jha et al. | |
| 8,599,864 B2 | 12/2013 | Chung | |
| 8,615,008 B2 | 12/2013 | Natarajan | |
| 8,619,788 B1 | 12/2013 | Sankaran | |
| 8,625,616 B2 | 1/2014 | Vobbilisetty | |
| 8,705,526 B1 | 4/2014 | Hasan | |
| 8,706,905 B1 | 4/2014 | McGlaughlin | |
| 8,717,895 B2 | 5/2014 | Koponen | |
| 8,724,456 B1 | 5/2014 | Hong | |
| 8,792,501 B1 | 7/2014 | Rustagi | |
| 8,798,045 B1 | 8/2014 | Aybay | |
| 8,798,055 B1* | 8/2014 | An | H04L 49/604 370/390 |
| 8,804,732 B1 | 8/2014 | Hepting | |
| 8,804,736 B1 | 8/2014 | Drake | |
| 8,806,031 B1 | 8/2014 | Kondur | |
| 8,826,385 B2 | 9/2014 | Congdon | |
| 8,918,631 B1 | 12/2014 | Kumar | |

(56) References Cited

U.S. PATENT DOCUMENTS

| | | |
|---|---|---|
| 8,937,865 B1 | 1/2015 | Kumar |
| 8,948,181 B2 | 2/2015 | Kapadia |
| 8,971,173 B1 | 3/2015 | Choudhury |
| 9,019,976 B2 | 4/2015 | Gupta |
| 9,178,793 B1 | 11/2015 | Marlow |
| 9,231,890 B2 | 1/2016 | Vobbilisetty |
| 9,350,680 B2 | 5/2016 | Thayalan |
| 9,401,818 B2 | 7/2016 | Venkatesh |
| 9,438,447 B2 | 9/2016 | Basso |
| 9,524,173 B2 | 12/2016 | Guntaka |
| 9,626,255 B2 | 4/2017 | Guntaka |
| 9,628,407 B2 | 4/2017 | Guntaka |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0027885 A1 | 3/2002 | Ben-Ami |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0010600 A1 | 1/2004 | Baldwin |
| 2004/0088668 A1 | 1/2004 | Bornowski |
| 2004/0047349 A1 | 3/2004 | Fujita |
| 2004/0049699 A1 | 3/2004 | Griffith |
| 2004/0057430 A1 | 3/2004 | Paavolainen |
| 2004/0081171 A1 | 4/2004 | Finn |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0036488 A1 | 2/2005 | Kalkunte |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0093254 A1 | 4/2006 | Ge |
| 2006/0092860 A1* | 5/2006 | Higashitaniguchi .... H04L 41/12 370/255 |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0206655 A1 | 9/2006 | Chappell |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | Desanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0206762 A1 | 9/2007 | Chandra |
| 2007/0211712 A1 | 9/2007 | Fitch et al. |
| 2007/0220059 A1 | 9/2007 | Lu |
| 2007/0226214 A1 | 9/2007 | Smits |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2007/0294563 A1* | 12/2007 | Bose .................. G06F 11/2092 714/5.11 |
| 2008/0052487 A1 | 2/2008 | Akahane |
| 2008/0056135 A1 | 3/2008 | Lee |
| 2008/0056300 A1 | 3/2008 | Williams |
| 2008/0057918 A1 | 3/2008 | Abrant |
| 2008/0065760 A1 | 3/2008 | Damm |
| 2008/0075078 A1 | 3/2008 | Watanabe |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |

(56) References Cited

U.S. PATENT DOCUMENTS

| | | | |
|---|---|---|---|
| 2008/0133760 A1 | 6/2008 | Berkvens | |
| 2008/0159260 A1 | 7/2008 | Vobbilisetty | |
| 2008/0159277 A1 | 7/2008 | Vobbilisetty | |
| 2008/0165705 A1 | 7/2008 | Umayabashi | |
| 2008/0172492 A1 | 7/2008 | Raghunath | |
| 2008/0181196 A1 | 7/2008 | Regan | |
| 2008/0181243 A1 | 7/2008 | Vobbilisetty | |
| 2008/0186968 A1 | 8/2008 | Farinacci | |
| 2008/0186981 A1 | 8/2008 | Seto | |
| 2008/0205377 A1 | 8/2008 | Chao | |
| 2008/0212578 A1* | 9/2008 | Sankey | H04L 12/66 370/389 |
| 2008/0219172 A1 | 9/2008 | Mohan | |
| 2008/0225852 A1 | 9/2008 | Melman | |
| 2008/0225853 A1 | 9/2008 | Melman | |
| 2008/0228897 A1 | 9/2008 | Ko | |
| 2008/0240129 A1 | 10/2008 | Elmeleegy | |
| 2008/0253380 A1 | 10/2008 | Cazares | |
| 2008/0267179 A1 | 10/2008 | Lavigne | |
| 2008/0285458 A1 | 11/2008 | Lysne | |
| 2008/0285555 A1 | 11/2008 | Ogasahara | |
| 2008/0288020 A1 | 11/2008 | Einav | |
| 2008/0298248 A1 | 12/2008 | Roeck | |
| 2008/0304498 A1 | 12/2008 | Jorgensen | |
| 2008/0304519 A1 | 12/2008 | Koenen | |
| 2008/0310342 A1 | 12/2008 | Kruys | |
| 2009/0022069 A1 | 1/2009 | Khan | |
| 2009/0024734 A1 | 1/2009 | Merbach | |
| 2009/0037607 A1 | 2/2009 | Farinacci | |
| 2009/0037977 A1 | 2/2009 | Gai | |
| 2009/0041046 A1 | 2/2009 | Hirata | |
| 2009/0042270 A1 | 2/2009 | Shelly | |
| 2009/0044270 A1 | 2/2009 | Shelly | |
| 2009/0067422 A1 | 3/2009 | Poppe | |
| 2009/0067442 A1 | 3/2009 | Killian | |
| 2009/0079560 A1 | 3/2009 | Fries | |
| 2009/0080345 A1 | 3/2009 | Gray | |
| 2009/0083445 A1 | 3/2009 | Ganga | |
| 2009/0092042 A1 | 4/2009 | Yuhara | |
| 2009/0092043 A1 | 4/2009 | Lapuh | |
| 2009/0094354 A1 | 4/2009 | Rastogi | |
| 2009/0106298 A1 | 4/2009 | Furusho | |
| 2009/0106405 A1 | 4/2009 | Mazarick | |
| 2009/0113408 A1 | 4/2009 | Toeroe | |
| 2009/0116381 A1 | 5/2009 | Kanda | |
| 2009/0122700 A1 | 5/2009 | Aboba | |
| 2009/0129384 A1 | 5/2009 | Regan | |
| 2009/0129389 A1 | 5/2009 | DeFretay | |
| 2009/0138577 A1 | 5/2009 | Casado | |
| 2009/0138752 A1 | 5/2009 | Graham | |
| 2009/0144720 A1 | 6/2009 | Roush | |
| 2009/0161584 A1 | 6/2009 | Guan | |
| 2009/0161670 A1 | 6/2009 | Shepherd | |
| 2009/0168647 A1 | 7/2009 | Holness | |
| 2009/0199177 A1 | 8/2009 | Edwards | |
| 2009/0204965 A1 | 8/2009 | Tanaka | |
| 2009/0213783 A1 | 8/2009 | Moreton | |
| 2009/0222879 A1 | 9/2009 | Kostal | |
| 2009/0225752 A1 | 9/2009 | Mitsumori | |
| 2009/0232031 A1 | 9/2009 | Vasseur | |
| 2009/0245112 A1 | 10/2009 | Okazaki | |
| 2009/0245137 A1 | 10/2009 | Hares | |
| 2009/0245242 A1 | 10/2009 | Carlson | |
| 2009/0246137 A1 | 10/2009 | Hares | |
| 2009/0249444 A1 | 10/2009 | Macauley | |
| 2009/0252049 A1 | 10/2009 | Ludwig | |
| 2009/0252061 A1 | 10/2009 | Small | |
| 2009/0252503 A1 | 10/2009 | Ishigami | |
| 2009/0260083 A1 | 10/2009 | Szeto | |
| 2009/0279558 A1 | 11/2009 | Davis | |
| 2009/0279701 A1 | 11/2009 | Moisand | |
| 2009/0292858 A1 | 11/2009 | Lambeth | |
| 2009/0316721 A1 | 12/2009 | Kanda | |
| 2009/0323698 A1 | 12/2009 | LeFaucheur | |
| 2009/0323708 A1 | 12/2009 | Ihle | |
| 2009/0327392 A1 | 12/2009 | Tripathi | |
| 2009/0327462 A1 | 12/2009 | Adams | |
| 2010/0002382 A1 | 1/2010 | Aybay | |
| 2010/0027420 A1 | 2/2010 | Smith | |
| 2010/0027429 A1 | 2/2010 | Jorgens | |
| 2010/0039961 A1* | 2/2010 | Tallet | H04L 12/462 370/256 |
| 2010/0042869 A1 | 2/2010 | Szabo | |
| 2010/0046471 A1 | 2/2010 | Hattori | |
| 2010/0054260 A1 | 3/2010 | Pandey | |
| 2010/0061269 A1 | 3/2010 | Banerjee | |
| 2010/0074175 A1 | 3/2010 | Banks | |
| 2010/0077471 A1* | 3/2010 | Schleiss | H04L 63/0227 726/13 |
| 2010/0085981 A1 | 4/2010 | Gupta | |
| 2010/0097941 A1 | 4/2010 | Carlson | |
| 2010/0103813 A1 | 4/2010 | Allan | |
| 2010/0103939 A1 | 4/2010 | Carlson | |
| 2010/0114818 A1 | 5/2010 | Lier | |
| 2010/0131636 A1 | 5/2010 | Suri | |
| 2010/0157844 A1 | 6/2010 | Casey | |
| 2010/0158024 A1 | 6/2010 | Sajassi | |
| 2010/0165877 A1 | 7/2010 | Shukla | |
| 2010/0165995 A1 | 7/2010 | Mehta | |
| 2010/0168467 A1 | 7/2010 | Johnston | |
| 2010/0169467 A1 | 7/2010 | Shukla | |
| 2010/0169948 A1 | 7/2010 | Budko | |
| 2010/0182920 A1 | 7/2010 | Matsuoka | |
| 2010/0189119 A1 | 7/2010 | Sawada | |
| 2010/0192225 A1 | 7/2010 | Ma | |
| 2010/0195489 A1 | 8/2010 | Zhou | |
| 2010/0195529 A1 | 8/2010 | Liu | |
| 2010/0214913 A1 | 8/2010 | Kompella | |
| 2010/0215042 A1 | 8/2010 | Sato | |
| 2010/0215049 A1 | 8/2010 | Raza | |
| 2010/0220724 A1 | 9/2010 | Rabie | |
| 2010/0226368 A1 | 9/2010 | Mack-Crane | |
| 2010/0226381 A1 | 9/2010 | Mehta | |
| 2010/0246388 A1 | 9/2010 | Gupta | |
| 2010/0246580 A1 | 9/2010 | Kaganoi | |
| 2010/0254703 A1 | 10/2010 | Kirkpatrick | |
| 2010/0257263 A1 | 10/2010 | Casado | |
| 2010/0258263 A1 | 10/2010 | Douxchamps | |
| 2010/0265849 A1 | 10/2010 | Harel | |
| 2010/0271960 A1 | 10/2010 | Krygowski | |
| 2010/0272107 A1 | 10/2010 | Papp | |
| 2010/0281106 A1 | 11/2010 | Ashwood-Smith | |
| 2010/0284414 A1 | 11/2010 | Gray | |
| 2010/0284418 A1 | 11/2010 | Gray | |
| 2010/0284698 A1 | 11/2010 | McColloch | |
| 2010/0287262 A1 | 11/2010 | Elzur | |
| 2010/0287548 A1 | 11/2010 | Zhou | |
| 2010/0290464 A1 | 11/2010 | Assarpour | |
| 2010/0290472 A1 | 11/2010 | Raman | |
| 2010/0290473 A1 | 11/2010 | Enduri | |
| 2010/0299527 A1 | 11/2010 | Arunan | |
| 2010/0303071 A1 | 12/2010 | Kotalwar | |
| 2010/0303075 A1 | 12/2010 | Tripathi | |
| 2010/0303083 A1 | 12/2010 | Belanger | |
| 2010/0309820 A1 | 12/2010 | Rajagopalan | |
| 2010/0309912 A1 | 12/2010 | Mehta | |
| 2010/0315972 A1* | 12/2010 | Plotnik | H04L 67/16 370/254 |
| 2010/0316055 A1* | 12/2010 | Belanger | H04L 49/15 370/396 |
| 2010/0329110 A1 | 12/2010 | Rose | |
| 2010/0329265 A1* | 12/2010 | Lapuh | H04L 12/4645 370/395.53 |
| 2011/0007738 A1 | 1/2011 | Berman | |
| 2011/0019678 A1 | 1/2011 | Mehta | |
| 2011/0032945 A1 | 2/2011 | Mullooly | |
| 2011/0035489 A1 | 2/2011 | McDaniel | |
| 2011/0035498 A1 | 2/2011 | Shah | |
| 2011/0044339 A1 | 2/2011 | Kotalwar | |
| 2011/0044352 A1 | 2/2011 | Chaitou | |
| 2011/0051723 A1 | 3/2011 | Rabie | |
| 2011/0058547 A1 | 3/2011 | Waldrop | |
| 2011/0064086 A1 | 3/2011 | Xiong | |
| 2011/0064089 A1 | 3/2011 | Hidaka | |

(56) References Cited

U.S. PATENT DOCUMENTS

| | | |
|---|---|---|
| 2011/0072208 A1 | 3/2011 | Gulati |
| 2011/0085560 A1 | 4/2011 | Chawla |
| 2011/0085562 A1 | 4/2011 | Bao |
| 2011/0085563 A1 | 4/2011 | Kotha |
| 2011/0088011 A1 | 4/2011 | Ouali |
| 2011/0110266 A1 | 5/2011 | Li |
| 2011/0134797 A1* | 6/2011 | Banks ............... H04W 40/246 370/254 |
| 2011/0134802 A1 | 6/2011 | Rajagopalan |
| 2011/0134803 A1 | 6/2011 | Dalvi |
| 2011/0134924 A1* | 6/2011 | Hewson .............. H04L 12/4625 370/392 |
| 2011/0134925 A1 | 6/2011 | Safrai |
| 2011/0142053 A1 | 6/2011 | Van |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0222413 A1* | 9/2011 | Shukla ............... H04L 43/0811 370/241.1 |
| 2011/0225540 A1 | 9/2011 | d'Entremont |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1* | 11/2011 | Vobbilisetty ............ H04L 45/46 370/392 |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0055274 A1 | 12/2011 | Hegge |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020206 A1* | 1/2012 | Busi ................ H04L 41/00 370/217 |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1 | 2/2012 | Humphries |
| 2012/0033669 A1 | 2/2012 | Mohandas |
| 2012/0033672 A1 | 2/2012 | Page |
| 2012/0039163 A1 | 2/2012 | Nakajima |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1* | 4/2012 | Nagapudi ........... H04L 12/4633 370/401 |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243359 A1 | 9/2012 | Keesara |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0281700 A1 | 11/2012 | Koganti |
| 2012/0287785 A1 | 11/2012 | Kamble |
| 2012/0294192 A1 | 11/2012 | Masood |
| 2012/0294194 A1 | 11/2012 | Balasubramanian |
| 2012/0230800 A1 | 12/2012 | Kamble |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003608 A1* | 1/2013 | Lei .................. H04L 12/462 370/256 |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0034094 A1 | 2/2013 | Cardona |
| 2013/0044629 A1* | 2/2013 | Biswas .............. H04L 67/2804 370/254 |
| 2013/0058354 A1 | 3/2013 | Casado |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0124707 A1 | 5/2013 | Ananthapadmanabha |
| 2013/0124750 A1* | 5/2013 | Anumala ........... H04L 12/4625 709/232 |
| 2013/0127848 A1 | 5/2013 | Joshi |
| 2013/0132296 A1 | 5/2013 | Manfred |
| 2013/0135811 A1 | 5/2013 | Dunwoody |
| 2013/0136123 A1 | 5/2013 | Ge |
| 2013/0145008 A1 | 6/2013 | Kannan |
| 2013/0148546 A1 | 6/2013 | Eisenhauer |
| 2013/0148663 A1 | 6/2013 | Xiong |
| 2013/0156425 A1 | 6/2013 | Kirkpatrick |
| 2013/0163594 A1* | 6/2013 | Sharma ................ H04L 45/64 370/392 |
| 2013/0194914 A1 | 8/2013 | Agarwal |
| 2013/0201992 A1 | 8/2013 | Masaki |
| 2013/0219473 A1 | 8/2013 | Schaefer |
| 2013/0223221 A1 | 8/2013 | Xu |
| 2013/0223449 A1 | 8/2013 | Koganti |

(56) References Cited

U.S. PATENT DOCUMENTS

| | | |
|---|---|---|
| 2013/0250951 A1 | 9/2013 | Koganti |
| 2013/0250958 A1 | 9/2013 | Watanabe |
| 2013/0259037 A1 | 10/2013 | Natarajan |
| 2013/0266015 A1* | 10/2013 | Qu .................... H04L 45/74 370/392 |
| 2013/0268590 A1 | 10/2013 | Mahadevan |
| 2013/0272135 A1 | 10/2013 | Leong |
| 2013/0294451 A1* | 11/2013 | Li .................... H04L 45/66 370/392 |
| 2013/0297757 A1 | 11/2013 | Han |
| 2013/0301425 A1 | 11/2013 | Chandra |
| 2013/0301642 A1* | 11/2013 | Radhakrishnan ....... H04L 45/66 370/392 |
| 2013/0308492 A1 | 11/2013 | Baphna |
| 2013/0308647 A1 | 11/2013 | Rosset |
| 2013/0315125 A1 | 11/2013 | Ravishankar |
| 2013/0315246 A1* | 11/2013 | Zhang .................. H04L 12/56 370/392 |
| 2013/0315586 A1 | 11/2013 | Kipp |
| 2013/0322427 A1 | 12/2013 | Stiekes |
| 2013/0332660 A1 | 12/2013 | Talagala |
| 2013/0336104 A1 | 12/2013 | Talla |
| 2013/0346583 A1 | 12/2013 | Low |
| 2014/0013324 A1 | 1/2014 | Zhang |
| 2014/0019608 A1 | 1/2014 | Kawakami |
| 2014/0025736 A1 | 1/2014 | Wang |
| 2014/0029419 A1 | 1/2014 | Jain |
| 2014/0044126 A1* | 2/2014 | Sabhanatarajan et al. ... 370/354 |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0071987 A1* | 3/2014 | Janardhanan ........... H04L 45/66 370/390 |
| 2014/0086250 A1* | 3/2014 | Mitsumori .............. H04L 45/72 370/392 |
| 2014/0086253 A1 | 3/2014 | Yong |
| 2014/0092738 A1 | 4/2014 | Grandhi |
| 2014/0105034 A1 | 4/2014 | Huawei |
| 2014/0112122 A1 | 4/2014 | Kapadia |
| 2014/0140243 A1 | 5/2014 | Ashwood-Smith |
| 2014/0157251 A1 | 6/2014 | Hocker |
| 2014/0169368 A1 | 6/2014 | Grover |
| 2014/0192804 A1 | 7/2014 | Ghanwani |
| 2014/0241147 A1 | 8/2014 | Rajagopalan |
| 2014/0258446 A1 | 9/2014 | Bursell |
| 2014/0269701 A1 | 9/2014 | Kaushik |
| 2014/0269720 A1 | 9/2014 | Arvindinivasan |
| 2014/0269733 A1 | 9/2014 | Venkatesh |
| 2014/0298091 A1 | 10/2014 | Carlen |
| 2014/0355477 A1 | 12/2014 | Moopath |
| 2014/0362854 A1 | 12/2014 | Addanki |
| 2014/0362859 A1 | 12/2014 | Addanki |
| 2015/0009992 A1 | 1/2015 | Zhang |
| 2015/0010007 A1 | 1/2015 | Matsuhira |
| 2015/0016300 A1 | 1/2015 | Devireddy |
| 2015/0030031 A1 | 1/2015 | Zhou |
| 2015/0092593 A1 | 4/2015 | Kompella |
| 2015/0110111 A1* | 4/2015 | Song .................... H04L 12/6418 370/392 |
| 2015/0110487 A1 | 4/2015 | Fenkes |
| 2015/0117256 A1 | 4/2015 | Sabaa |
| 2015/0127618 A1 | 5/2015 | Alberti |
| 2015/0139234 A1* | 5/2015 | Hu .................... H04L 45/66 370/392 |
| 2015/0143369 A1 | 5/2015 | Zheng |
| 2015/0172098 A1 | 6/2015 | Agarwal |
| 2015/0188753 A1 | 7/2015 | Anumala |
| 2015/0195093 A1 | 7/2015 | Ramasubramani |
| 2015/0222506 A1 | 8/2015 | Kizhakkiniyil |
| 2015/0248298 A1 | 9/2015 | Gavrilov |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0072899 A1 | 3/2016 | Tung |
| 2016/0087885 A1 | 3/2016 | Tripathi |
| 2016/0139939 A1 | 5/2016 | Bosch |
| 2016/0182458 A1 | 6/2016 | Shatzkamer |
| 2016/0261428 A1* | 9/2016 | Song .................... H04L 12/413 |
| 2016/0344640 A1 | 11/2016 | Soderlund et al. |
| 2017/0026197 A1 | 1/2017 | Venkatesh |
| 2017/0097841 A1 | 4/2017 | Chang |

FOREIGN PATENT DOCUMENTS

| | | |
|---|---|---|
| CN | 101064682 | 10/2007 |
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102404181 | 4/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 2001167 A1 | 8/2007 |
| EP | 1916807 A2 | 4/2008 |
| EP | 2854352 | 4/2015 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2012093429 | 7/2012 |
| WO | 2014031781 | 2/2014 |

OTHER PUBLICATIONS

Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438, filed Oct. 19, 2012.
Office action dated Jun. 8, 2015, U.S. Appl. No. 14/178,042, filed Feb. 11, 2014.
Office Action Dated Jun. 10, 2015, U.S. Appl. No. 13/890,150, filed May 8, 2013.
Office Action dated Jun. 18, 215, U.S. Appl. No. 13/098,490, filed May 2, 2011.
Eastlake, D. et al., 'RBridges: TRILL Header Options', Dec. 24, 2009, pp. 1-17, TRILL Working Group.
Perlman, Radia et al., 'RBridge VLAN Mapping', TRILL Working Group, Dec. 4, 2009, pp. 1-12.
Switched Virtual Networks. 'Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.

(56) References Cited

OTHER PUBLICATIONS

Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Oct. 2, 2013, U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade, 'Brocade Fabrics OS (FOS) 6.2 Virtual Fabrics Feature Frequently Asked Questions', pp. 1-6, 2009 Brocade Communications Systems, Inc.
Brocade, 'The Effortless Network: Hyperedge Technology for the Campus LAN' 2012.
Brocade 'An Introduction to Brocade VCS Fabric Technology', Dec. 3, 2012.
Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Huang, Nen-Fu et al., 'An Effective Spanning Tree Algorithm for a Bridged LAN', Mar. 16, 1992.
Knight, 'Network Based IP VPN Architecture using Virtual Routers', May 2003.
Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004 (Jun. 1, 2004), pp. 124-131, XP001198207, ISSN: 0163-6804, DOI: 10.1109/MCOM.2004.1304248.
Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].

(56) References Cited

OTHER PUBLICATIONS

Lapuh, Roger et al., 'Split Multi-Link Trunking (SMLT)', Network Working Group, Oct. 2012.
Lapuh, Roger et al., 'Split Multi-link Trunking (SMLT) draft-lapuh-network-smlt-08', Jan. 2009.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-narten-n vo3-over I ay-problem-statement-01', Oct. 31, 2011.
Office Action for U.S. Appl. No. 13/042,259, filed Mar. 7, 2011, from Jaroenchonwanit, Bunjob, dated Jan. 16, 2014.
Office Action for U.S. Appl. No. 13/087,239, filed Apr. 14, 2011, dated May 22, 2013.
Office Action for U.S. Appl. No. 13/092,724, filed Apr. 22, 2011, dated Jul. 16, 2013.
Office Action for U.S. Appl. No. 13/351,513, filed Jan. 17, 2012, dated Feb. 28, 2014.
Office Action for U.S. Appl. No. 13/533,843, filed Jun. 26, 2012, dated Oct. 21, 2013.
Perlman, Radia et al., 'Challenges and Opportunities in the Design of TRILL: a Routed layer 2 Technology', 2009.
Perlman, Radia et al., 'RBridges: Base Protocol Specification; Draft-ietf-trill-rbridge-protocol-16.txt', Mar. 3, 2010, pp. 1-117.
S. Nadas et al., 'Virtual Router Redundancy Protocol (VRRP) Version 3 for IPv4 and IPv6', Internet Engineering Task Force, Mar. 2010.
'An Introduction to Brocade VCS Fabric Technology', Brocade white paper, http://community.brocade.com/docs/DOC-2954, Dec. 3, 2012.
U.S. Appl. No. 13/030,806 Office Action dated Dec. 3, 2012.
Office Action dated Apr. 9, 2014, U.S. Appl. No. 13/092,752, filed Apr. 22, 2011.
Brocade, 'Fastlron and Turbolron 24x Configuration Guide', Feb. 16, 2010.
Brocade 'Brocade Unveils 'The Effortless Network'', http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Office Action for U.S. Appl. No. 13/092,752, filed Apr. 22, 2011, from Park, Jung H., dated Jul. 18, 2013.
Office Action for U.S. Appl. No. 13/365,993, filed Feb. 3, 2012, from Cho, Hong Sol., dated Jul. 23, 2013.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/365,808, filed Jul. 18, 2013, dated Jul. 18, 2013.
Office Action for U.S. Appl. No. 13/092,887, dated Jan. 6, 2014.
'RBridges: Base Protocol Specification', IETF Draft, Perlman et al., Jun. 26, 2009.
Office Action for U.S. Appl. No. 13/030,806, filed Feb. 18, 2011, dated Dec. 3, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/598,204, filed Aug. 29, 2012, dated Feb. 20, 2014.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.

(56) References Cited

OTHER PUBLICATIONS

Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Office Action for U.S. Appl. No. 13/087,239, filed Apr. 14, 2011, dated Dec. 5, 2012.
Perlman R: 'Challenges and opportunities in the design of TRILL: a routed layer 2 technology', 2009 IEEE GLOBECOM Workshops, Honolulu, HI, USA, Piscataway, NJ, USA, Nov. 30, 2009 (Nov. 30, 2009), pp. 1-6, XP002649647, DOI: 10.1109/GLOBECOM.2009. 5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/786,328, filed Mar. 5, 2013, dated Mar. 13, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Rosen, E. et al., "BGP/MPLS VPNs", Mar. 1999.
Office Action for U.S. Appl. No. 14/577,785, filed Dec. 19, 2014, dated Apr. 13, 2015.
Office Action for U.S. Appl. No. 13/425,238, filed Mar. 20, 2012, dated Mar. 12, 2015.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office Action dated Jun. 18, 2015, U.S. Appl. No. 13/098,490, filed May 2, 2011.
Office Action dated Jun. 16, 2015, U.S. Appl. No. 13/048,817, filed Mar. 15, 2011.
Touch, J. et al., 'Transparent Interconnection of Lots of Links (TRILL): Problem and Applicability Statement', May 2009, Network Working Group, pp. 1-17.
Zhai F. Hu et al. 'RBridge: Pseudo-Nickname; draft-hu-trill-pseudonode-nickname-02.txt', May 15, 2012.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438 filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
"Network based IP VPN Architecture using Virtual Routers" Paul Knight et al.
Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action for U.S. Appl. No. 14/662,095, dated Mar. 24, 2017.
Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.
Office Action for U.S. Appl. No. 14/662,092, dated Mar. 29, 2017.
Office Action for U.S. Appl. No. 14/817,097, dated May 4, 2017.
Office Action for U.S. Appl. No. 14/872,966, dated Apr. 20, 2017.
Office Action for U.S. Appl. No. 14/680,915, dated May 3, 2017.
Office Action for U.S. Appl. No. 14/792,166, dated Apr. 26, 2017.
Office Action for U.S. Appl. No. 14/660,803, dated May 17, 2017.
Office Action for U.S. Appl. No. 14/488,173, dated May 12, 2017.
Office Action for U.S. Appl. No. 13/288,822, dated May 26, 2017.
Office Action for U.S. Appl. No. 14/329,447, dated Jun. 8, 2017.
Office Action for U.S. Appl. No. 14/510,913, dated Jun. 30, 2017.
Office Action for U.S. Appl. No. 15/005,946, dated Jul. 14, 2017.
Office Action for U.S. Appl. No. 13/092,873, dated Jul. 19, 2017.
Office Action for U.S. Appl. No. 15/047,539, dated Aug. 7, 2017.
Office Action for U.S. Appl. No. 14/830,035, dated Aug. 28, 2017.
Office Action for U.S. Appl. No. 13/098,490, dated Aug. 24, 2017.
Office Action for U.S. Appl. No. 13/786,328, dated Aug. 21, 2017.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.

(56) References Cited

OTHER PUBLICATIONS

Office Action dated Feb. 8, 2017, U.S. Appl. No. 14/822,380, filed Aug. 10, 2015.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.

* cited by examiner

EXTENDED ETHERNET FABRIC SWITCHES

RELATED APPLICATION

This application claims the benefit of U.S. Provisional Application No. 61/896,544, titled "Ethernet Fabric Formation Based on VxLAN," by inventors Amr Sabaa, Muhammad Durrani, Mukhtiar Shaikh, Prasad P. Jogalekar, Jayanthi Jayaraman, and Arunkaruppaiya Adaikalam, filed 28 Oct. 2013, the disclosure of which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011, the disclosure of which is incorporated by reference herein.

BACKGROUND

Field

The present disclosure relates to network design. More specifically, the present disclosure relates to a method for a constructing a scalable switching system.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch.

Meanwhile, layer-2 (e.g., Ethernet) switching technologies continue to evolve. More routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

While a fabric switch brings many desirable features to a network, some issues remain unsolved in efficiently facilitating extended fabric switches (e.g., across datacenters).

SUMMARY

One embodiment of the present invention provides a switch. The switch includes a fabric switch module and a learning module. The fabric switch module maintains a membership in a first fabric switch. A fabric switch includes a plurality of switches and operates as a single switch. The first fabric switch is in an extended fabric switch which further comprises a second fabric switch. The learning module identifies from a notification message from the second fabric switch a media access control (MAC) address learned at the second fabric switch. The learning module stores the MAC address in a local MAC table in association with an Internet Protocol (IP) address of the second fabric switch.

In a variation on this embodiment, the IP address is a floating IP address and associated with a plurality of member switches of the second fabric switch.

In a variation on this embodiment, the switch further comprises a discovery module which identifies a discovery message comprising the IP address as a source IP address. This discovery message is a multicast message. In response, the discovery module includes the IP address in a neighbor list of the extended fabric switch. This neighbor list includes a respective IP address associated with a respective fabric switch in the extended fabric switch.

In a variation on this embodiment, the switch further comprises a forwarding module which identifies the MAC address as destination MAC address of a packet encapsulated in a fabric encapsulation header. In response to identifying the MAC address, the forwarding module encapsulates the packet in a tunnel encapsulation header. The destination address of the tunnel encapsulation header is the IP address.

In a further variation, the source MAC address of the packet is associated with a first virtual machine running on a host machine coupled to the first fabric switch, and the destination MAC address of the packet is associated with a second virtual machine running on a host machine coupled to the second fabric switch. The first and second virtual machines are in the same virtual local area network (VLAN).

In a variation on this embodiment, the switch further comprises a forwarding module which encapsulates an Address Resolution Protocol (ARP) request in a tunnel encapsulation header. The destination address of the tunnel encapsulation header is the IP address.

In a variation on this embodiment, the switch further comprises a forwarding module which encapsulates a packet destined to a virtual machine in a tunnel encapsulation header. The destination address of the tunnel encapsulation header is the IP address. This virtual machine has been migrated from a host machine coupled to the first fabric switch to a host machine coupled to the second fabric switch.

In a variation on this embodiment, the switch further comprises a forwarding module which identifies a packet encapsulated in a first tunnel encapsulation header. The destination address of the tunnel encapsulation header corresponds to a hypervisor. The forwarding module further encapsulates the encapsulated packet in a second tunnel encapsulation header. The destination address of the second tunnel encapsulation header is the IP address.

In a variation on this embodiment, the switch further comprises a high availability module which operates the switch as an active forwarder of an active-standby high availability protocol for a virtual machine. This virtual machine has been migrated from a host machine coupled to the second fabric switch to a host machine coupled to the first fabric switch.

In a variation on this embodiment, the switch further comprises a forwarding module which identifies a packet encapsulated in a fabric encapsulation header. The egress switch identifier of the fabric encapsulation header corresponds to a member switch of the second fabric switch. The forwarding module further encapsulates the encapsulated packet in a tunnel encapsulation header. The destination address of the tunnel encapsulation header is the IP address.

In a further variation, the fabric encapsulation header is one or more of: (i) a Transparent Interconnection of Lots of Links (TRILL) header, wherein ingress and egress switch identifiers of the fabric encapsulation header are TRILL routing bridge (RBridge) identifiers; and (ii) an IP header, wherein source and destination addresses of the fabric encapsulation header are IP addresses.

BRIEF DESCRIPTION OF THE FIGURES

In the figures, like reference numerals refer to the same figure elements.

DETAILED DESCRIPTION

Figure 1:
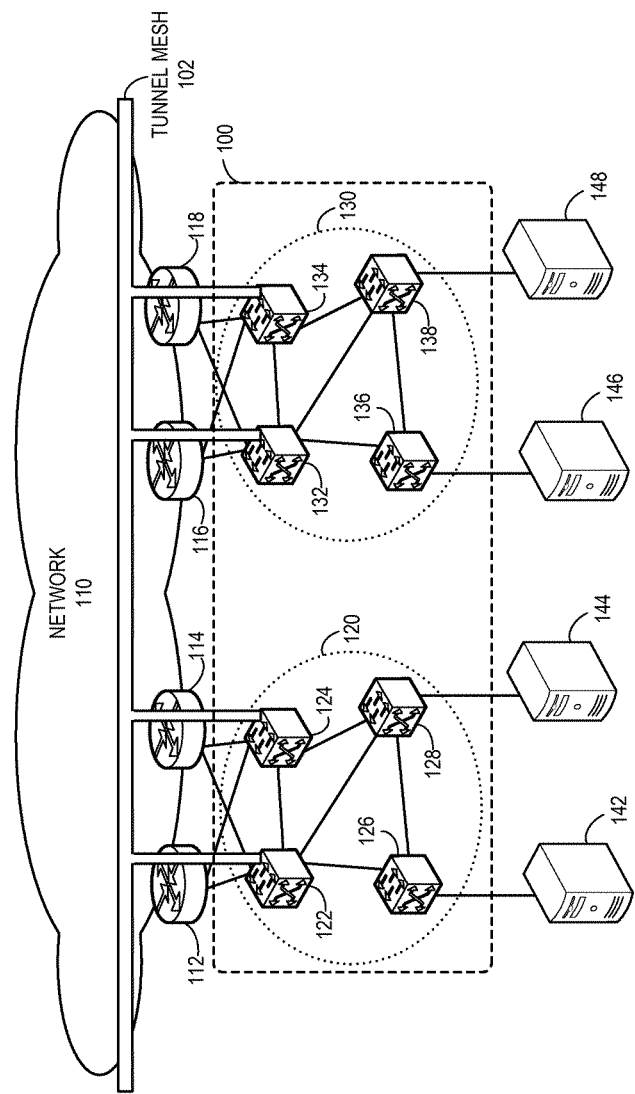
FIG. 1 illustrates an exemplary extended fabric switch, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of deploying a distributed fabric switch is solved by facilitating an extended fabric switch comprising a plurality of fabric switches, which can be in different datacenters. With existing technologies, a fabric switch typically is deployed within a datacenter and is not extended across multiple datacenters. As a result, virtual machine (VM) migration and workload management across datacenters may not be feasible. Moreover, when a member switch in a fabric switch learns media access control (MAC) address information (e.g., a learned MAC address and a corresponding virtual local area network (VLAN) tag), the switch shares that information only within the local fabric switch. Furthermore, when two fabric switches are interconnected, their connection is often established in layer-3 (e.g., via a wide area network (WAN)). However, such interconnection can be expensive since it relies on availability of layer-3 devices (e.g., routers) and may require extensive configuration of the layer-3 devices.

To solve this problem, a fabric switch is extended to one or more other fabric switches. These fabric switches, together, operate as an extended fabric switch. A respective fabric switch in an extended fabric switch can be referred to as a neighbor fabric switch of the extended fabric switch. Neighbor fabric switches of an extended fabric switch can be collocated in a local area network (LAN) or span a WAN (e.g., across multiple datacenters). In some embodiments, an extended fabric switch operates as a single fabric switch. A respective neighbor fabric switch includes one or more extension switches. These extension switches are capable of establishing tunnels with other extension switches in another neighbor fabric switch. These tunnels allow the neighbor fabric switches in an extended fabric switch to communicate with each other over a WAN.

During operation, an extension switch discovers other neighbor fabric switches. In some embodiments, the extension switch sends a discovery message to an All Switch Multicast (ASM) group to discover the neighbor fabric switches. This allows the extension switch to identify the neighbor fabric switch and extend the local fabric switch by establishing respective tunnels to the neighbor fabric switches. Furthermore, typically in a fabric switch, when a member switch learns a MAC address (and associated information, such as a VLAN tag), that member switch shares the learned MAC address (e.g., via a notification message) with other member switches. In an extended fabric switch, upon learning a MAC address (either locally or from another member switch), an extension switch shares the learned MAC address with other extension switches of neighbor fabric switches. As a result, a respective neighbor fabric switch can learn a MAC address learned in the extended fabric switch.

In a fabric switch, any number of switches coupled in an arbitrary topology may logically operate as a single switch. The fabric switch can be an Ethernet fabric switch or a virtual cluster switch (VCS), which can operate as a single Ethernet switch. Any member switch may join or leave the fabric switch in "plug-and-play" mode without any manual configuration. In some embodiments, a respective switch in the fabric switch is a Transparent Interconnection of Lots of Links (TRILL) routing bridge (RBridge). In some further embodiments, a respective switch in the fabric switch is an Internet Protocol (IP) routing-capable switch (e.g., an IP router). The TRILL protocol is described in Internet Engineering Task Force (IETF) Request for Comments (RFC) 6325, titled "Routing Bridges (RBridges): Base Protocol Specification," available at http://datatracker.ietf.org/doc/rfc6325/, which is incorporated by reference herein.

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

In this disclosure, the term "fabric switch" refers to a number of interconnected physical switches which form a single, scalable logical switch. These physical switches are referred to as member switches of the fabric switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally. Although the present disclosure is presented using examples based on a fabric switch, embodiments of the present invention are not limited to a fabric switch. Embodiments of the present invention are relevant to any computing device that includes a plurality of devices operating as a single device.

The term "end device" can refer to any device external to a fabric switch. Examples of an end device include, but are not limited to, a host machine, a conventional layer-2 switch, a layer-3 router, or any other type of network device. Additionally, an end device can be coupled to other switches or hosts further away from a layer-2 or layer-3 network. An end device can also be an aggregation point for a number of network devices to enter the fabric switch. An end device can also host one or more virtual machines.

The term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a TRILL RBridge, or a fabric switch comprising a plurality of similar or heterogeneous smaller physical and/or virtual switches.

The term "edge port" refers to a port on a fabric switch which exchanges data frames with a network device outside of the fabric switch (i.e., an edge port is not used for exchanging data frames with another member switch of a fabric switch). The term "inter-switch port" refers to a port which sends/receives data frames among member switches of a fabric switch. An edge port used in a tunnel between two neighbor fabric switches of a fabric switch can be referred to as an "extension port." The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, and an RBridge identifier. Note that the TRILL standard uses "RBridge ID" (RBridge identifier) to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is also used in a generic sense, is not limited to any bit format, and can refer to "RBridge ID," "RBridge nickname," or any other format that can identify an RBridge.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," or "datagram." The terms "packet" and "frame" are used interchangeably.

Network Architecture

FIG. 1 illustrates an exemplary extended fabric switch, in accordance with an embodiment of the present invention. As illustrated in FIG. 1, fabric switches 120 and 130 is extended to each other to form an extended fabric switch 100. Fabric switch 120 includes member switches 122, 124, 126, and 128; and fabric switch 130 includes member switches 132, 134, 136, and 138. End devices 142 and 144 are coupled to fabric switch 120 via switches 126 and 128, respectively; and end devices 146 and 148 are coupled to fabric switch 130 via switches 136 and 138, respectively. A member switch, such as switch 126 or 136, which couples an end device via an edge port, can be referred to as an edge switch.

Fabric switches 120 and 130 are coupled to each other via a network 110. In this example, network 110 can be a WAN or the Internet. Fabric switches 120 and 130 can also be in a LAN. Switches 122 and 124 are coupled to layer-3 devices (e.g., routers) 112 and 114. Similarly, switches 126 and 128 are coupled to layer-3 devices 116 and 118. Switch 122 uses extension ports to couple to layer-3 devices 112 and 114. To send a packet to fabric switch 130, switch 122 sends the packet via one of the extension ports. Suppose that the packet is forwarded via network 110 to layer-3 device 116, which in turn, forwards the packet to switch 132. Switch 132 receives the packet via a local extension port. In this way, fabric switches 120 and 130 communicate via network 110. It should be noted that devices in network 110 and extended fabric switch 100 can be physical or virtual.

In some embodiments, fabric switches 120 and 130 internally operate as respective TRILL networks (e.g., forward data packet based on the TRILL protocol). A respective member switch of fabric switches 120 and 130 can then be a TRILL RBridge (e.g., has an RBridge identifier which identifies a member switch in the corresponding fabric switch). In some further embodiments, fabric switches 120 and 130 internally operate as respective IP networks (e.g., forward data packet based on the IP protocol). A respective member switch of fabric switches 120 and 130 can then be an IP-capable switch (e.g., has an IP address which identifies a member switch in the corresponding fabric switch and/or a larger network). An IP-capable switch can calculate and maintain a local IP routing table (e.g., a routing information base or RIB), and is capable of forwarding packets based on its IP addresses.

Switches in a fabric switch use edge ports to communicate with end devices (e.g., non-member switches) and inter-switch ports to communicate with other member switches. Data communication via an edge port can be based on Ethernet and via an inter-switch port can be based on IP and/or TRILL protocol. For example, switch 126 of fabric switch 120 is coupled to end device 142 via an edge port and to switches 122 and 128 via inter-switch ports. Switch 126 can communicate with end device 142 based on Ethernet and with switch 122 and 128 based on IP or TRILL protocol. It should be noted that control message exchange via inter-switch ports can be based on a different protocol (e.g., Internet Protocol (IP) or Fibre Channel (FC) protocol).

With existing technologies, fabric switch 120 and 130 typically are deployed within respective datacenter and are not extended across multiple datacenters. As a result, VM migration and workload management across the respective datacenters of fabric switches 120 and 130 may not be feasible. When a member switch, such as switch 126, learns MAC address information (e.g., a learned MAC address and a corresponding virtual local area network (VLAN) tag), switch 126 shares the learned information only with other member switches of fabric switch 120 (i.e., switches 122, 124, and 128). Furthermore, when fabric switches 120 and 130 are interconnected, their connection is often established in layer-3 devices in network 110. However, such layer-3 devices are outside of fabric switches 120 and 130. As a result, such connection relies on availability of layer-3 devices in network 110. Moreover, to facilitate interconnection between fabric switches 120 and 130, extensive configuration of layer-3 devices 112, 114, 116, and 118 may be required.

To solve this problem, fabric switch 120 is extended to fabric switch 130, and fabric switch 130 is extended to fabric switch 120. Fabric switches 120 and 130, together, operate as extended fabric switch 100. Fabric switch 120 and 130 can be referred to as neighbor fabric switches of extended fabric switch 100. Neighbor fabric switches 120 and 130 can be collocated in a LAN or span a WAN, such as network 110. Neighbor fabric switches 120 and 130 can also be in different datacenters. Extended fabric switch 100 can operate as a single fabric switch. Switches 122 and 124 are extension switches of fabric switch 120, and switches 132 and 134 are extension switches of fabric switch 130. These extension switches are capable of establishing tunnels with other extension switches in another neighbor fabric switch. These tunnels allow neighbor fabric switches 120 and 130 to operate as a single extended fabric switch 100.

During operation, extension switch 122 discovers other neighbor fabric switches. In some embodiments, a respective extension switch in extended fabric switch 100 is configured with a membership to an All Switch Multicast (ASM) group. This ASM group can be used to exchange control messages between neighbor fabric switches 120 and 130. During the neighbor discovery process, extension switch 122 sends a discovery message, which is a multicast message, to the ASM group to discover neighbor fabric switch 130. Extension switches 124, 132, and 134 receive the discovery message. In some embodiments, since extension switch 124 is in the same fabric switch 120, extension switch 124 discards the discovery message.

Extension switches 132 and 134 receive the discovery message and discover fabric switch 120. The discovery message can include a fabric IP address associated with fabric switch 120. This fabric IP address can be a floating IP address and a respective extension switch of fabric switch 120 can terminate forwarding of a packet with the fabric IP address as the destination address. In some embodiments, the fabric IP address is assigned to a logical interface of extension switches 122 and/or 124. This logical interface can correspond to one or more physical ports in extension switches 122 and/or 124.

Upon receiving the discovery message, extension switches 132 and 134 discover fabric switch 120 to be a neighbor of their local fabric switch 130 and add the fabric IP address of fabric switch 120 to their neighbor list. In the same way, extension switch 124 also sends a discovery packet to the ASM group. On the other hand, extension switches 122 and 124 discover fabric switch 130 to be a neighbor of their local fabric switch 120 and add the fabric IP address of fabric switch 130 to their neighbor list. Once neighbor discovery is completed and a respective extension switch learns a respective fabric IP address of a corresponding neighbor fabric switch, extension switches 122, 124, 132, and 134 establish a tunnel mesh 102. Tunnel mesh 102 includes a full mesh of tunnels between a respective fabric switch pair in extended fabric switch 100. Examples of tunnels in tunnel mesh 102 include, but are not limited to, Virtual Extensible LAN (VXLAN) tunnel, Generic Routing Encapsulation (GRE) tunnel, and Network Virtualization using GRE (NVGRE) tunnel.

In some embodiments, extended fabric switch 100 includes a directory server. One of the extension switches in extended fabric switch 100 can operate as the directory server. A respective other extension switch in extended fabric switch 100 can be configured with the address of the directory server. The directory server maintains a list of fabric IP addresses, a respective of which is associated with a corresponding neighbor fabric switch. During operation, these other extension switches query the directory server to obtain the list of IP addresses. The directory server can send a response message responding to a respective query comprising the list of IP addresses. Another extension switch in extended fabric switch 100 can operate as a standby directory server, which can be in a different neighbor fabric switch. For example, switch 122 can operate as the directory server and switch 132 can operate as the standby directory server.

Furthermore, suppose that switch 126 learns the MAC address of end device 142. Switch 126 generates a notification message comprising the learned MAC address (e.g., in the payload) and sends the notification message to a respective other member switch of fabric switch 120 (i.e., switches 122, 124, and 128). Upon receiving the notification message, switch 122 creates an entry in the local MAC table (typically stored in a Content-Addressable Memory (CAM)) comprising the learned MAC address (and associated information) in association with the switch identifier. Furthermore, switch 122 creates a notification message comprising the learned MAC address (and associated information) and sends the notification message to the ASM group.

This notification message has the fabric IP address of fabric switch 120 as the source address and the multicast IP address of ASM group as the destination address. The notification message is forwarded via network 110 to reach extension switches 132 and 134. Upon receiving the notification message, extension switches 132 and 134 extract the MAC address (and associated information) and store the extracted information in association with the source IP address of the notification message.

In some embodiments, tunnel mesh 102 is associated with a tunnel identifier. Extension switches in extended fabric switch 100 use this tunnel identifier to identify the tunnel used to extend a fabric switch (i.e., tunnel mesh 102). In some embodiments, the tunnel identifier is a VXLAN Network Identifier (VNI). If a tunnel is not associated with the tunnel identifier, it is not in tunnel mesh 102 and the notification message comprising the learned MAC address is not forwarded via that tunnel. This allows fabric switches 120 and 130 to have other tunnel(s) in addition to tunnel mesh 102. In some embodiments, a respective extension switch in extended fabric switch 100 is preconfigured with the fabric IP addresses of fabric switch 120 and 130 and the tunnel identifier of tunnel mesh 102. Additionally, the extension switch can also be preconfigured with a VLAN tag for VXLAN encapsulation and a list of VLAN tags which are extended in both fabric switches 120 and 130.

In some embodiments, multiple virtual fabric switches can deployed within an extended fabric switch. A respective virtual fabric switch is associated with a separate tunnel mesh (e.g., with a different tunnel identifier). In some embodiments, openFlow can be used to define the virtual fabric switches. To improve the performance of Address Resolution Protocol (ARP) processing, extension switches can maintain an ARP proxy to limit ARP requests between neighbor fabric switches. Furthermore, to efficiently manage learned MAC addresses, an extension switch can learn the MAC address from a neighbor fabric switch if the extension switch is in communication (e.g., forwards frame) with that MAC address. Moreover, multicast forwarding can be optimized by forwarding multicast packet only to extension switches with a listener.

Neighbor Discovery

Figure 2A:
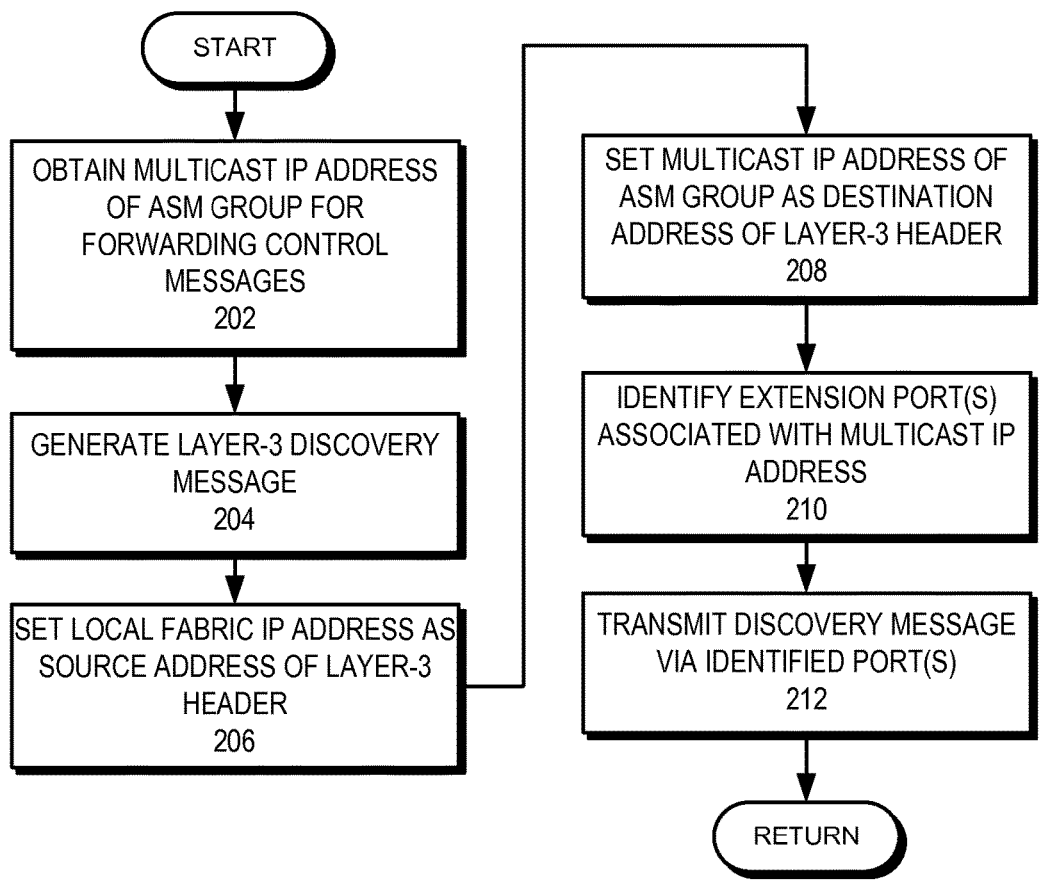
FIG. 2A presents a flowchart illustrating the process of an extension switch initiating a neighbor discovery in an extended fabric switch, in accordance with an embodiment of the present invention.

FIG. 2A presents a flowchart illustrating the process of an extension switch initiating neighbor discovery in an extended fabric switch, in accordance with an embodiment of the present invention. During operation, the extension switch obtains the multicast IP address of the ASM group for forwarding control messages (operation 202). The extension switch can send a join message to join the ASM group, or be preconfigured with a membership to the ASM group. The extension switch then generates a layer-3 discovery message (e.g., an IP multicast packet) (operation 204). The extension switch sets the local fabric IP address as the source address of the layer-3 header (operation 208). The extension switch sets the multicast IP address of the ASM group as the destination address of the layer-3 header (operation 210). The extension switch then identifies the extension port(s) associated with the multicast IP address (operation 212) and transmits the discovery message via the identified port(s) (operation 214).

Figure 2B:
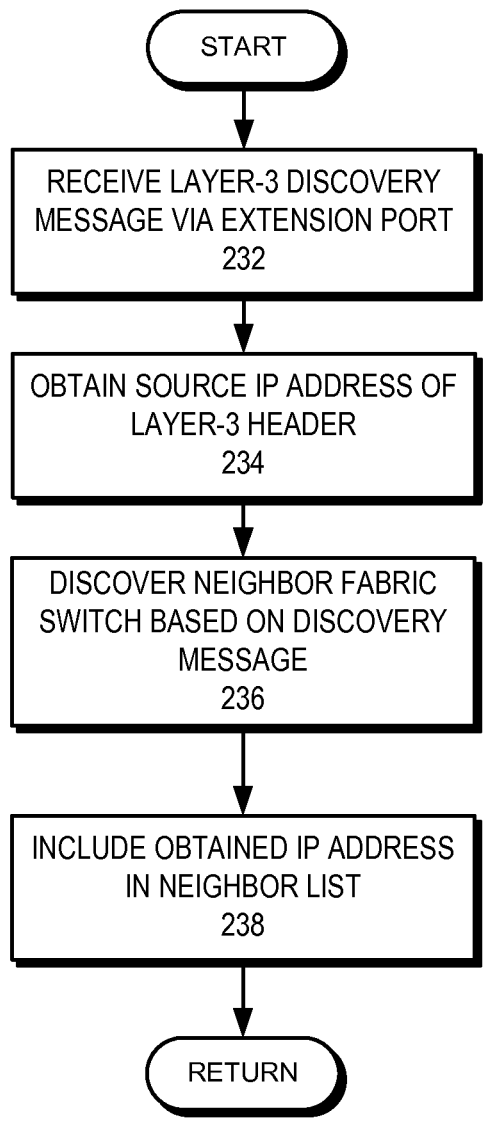
FIG. 2B presents a flowchart illustrating the process of an extension switch responding to neighbor discovery in an extended fabric switch, in accordance with an embodiment of the present invention.

FIG. 2B presents a flowchart illustrating the process of an extension switch responding to neighbor discovery in an extended fabric switch, in accordance with an embodiment of the present invention. During operation, the extension switch receives a layer-3 discovery message via a local extension port (operation 232). The extension switch obtains the source IP address of the layer-3 header (operation 234). This discovery message indicates that a neighbor fabric switch is establishing neighbor adjacency. The extension switch thus discovers a neighbor fabric switch based on the discovery message (operation 236) and includes the obtained IP address in the neighbor list (operation 238).

Figure 2C:
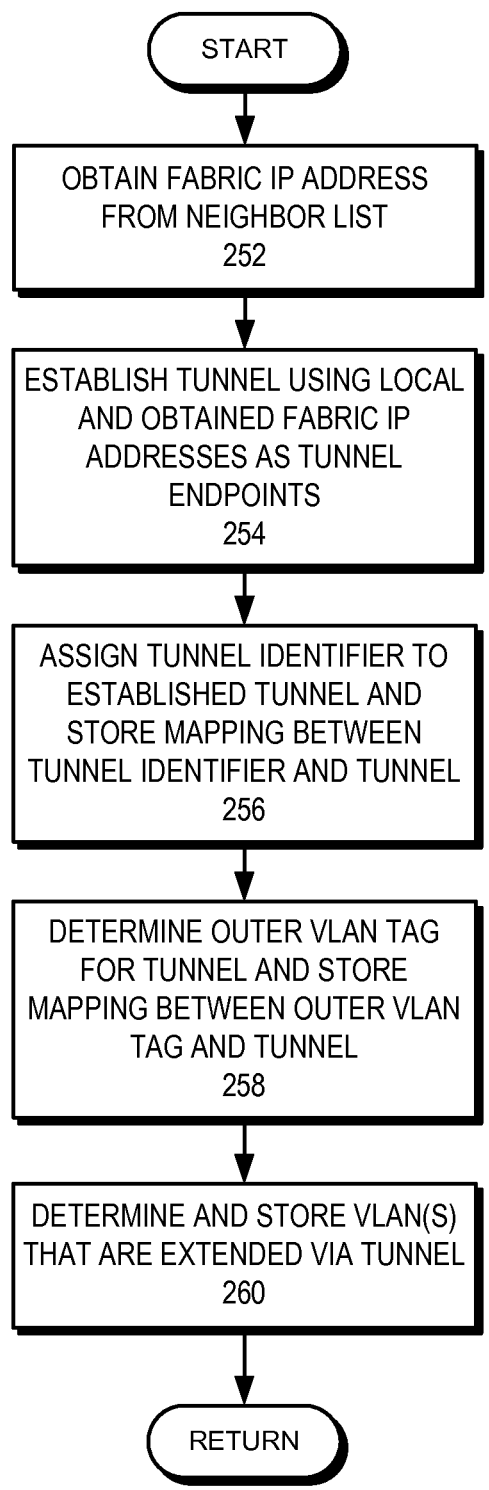
FIG. 2C presents a flowchart illustrating the process of an extension switch establishing tunnels with neighbor fabric switches, in accordance with an embodiment of the present invention.

FIG. 2C presents a flowchart illustrating the process of an extension switch establishing tunnels with a neighbor fabric switch, in accordance with an embodiment of the present invention. During operation, the extension switch obtains an IP address from a local neighbor list (operation 252) and establishes a tunnel using the local and obtained fabric IP addresses as tunnel endpoints (operation 254). This tunnel allows an extension switch to terminate tunnel-encapsulated packets. The extension switch assigns a tunnel identifier (e.g., a VNI) to the established tunnel and stores a mapping between the tunnel identifier and the tunnel (e.g., the fabric IP address) (operation 256). The extension switch determines the outer VLAN tag for the tunnel (e.g., an outer VLAN tag of a VXLAN header) and stores a mapping between the outer VLAN tag and the tunnel (operation 258). The extension switch also determines and stores the VLAN(s) that are extended via the tunnel (operation 260). It should be noted that these mappings can be preconfigured in the extension switch.

ARP Forwarding

Figure 3A:
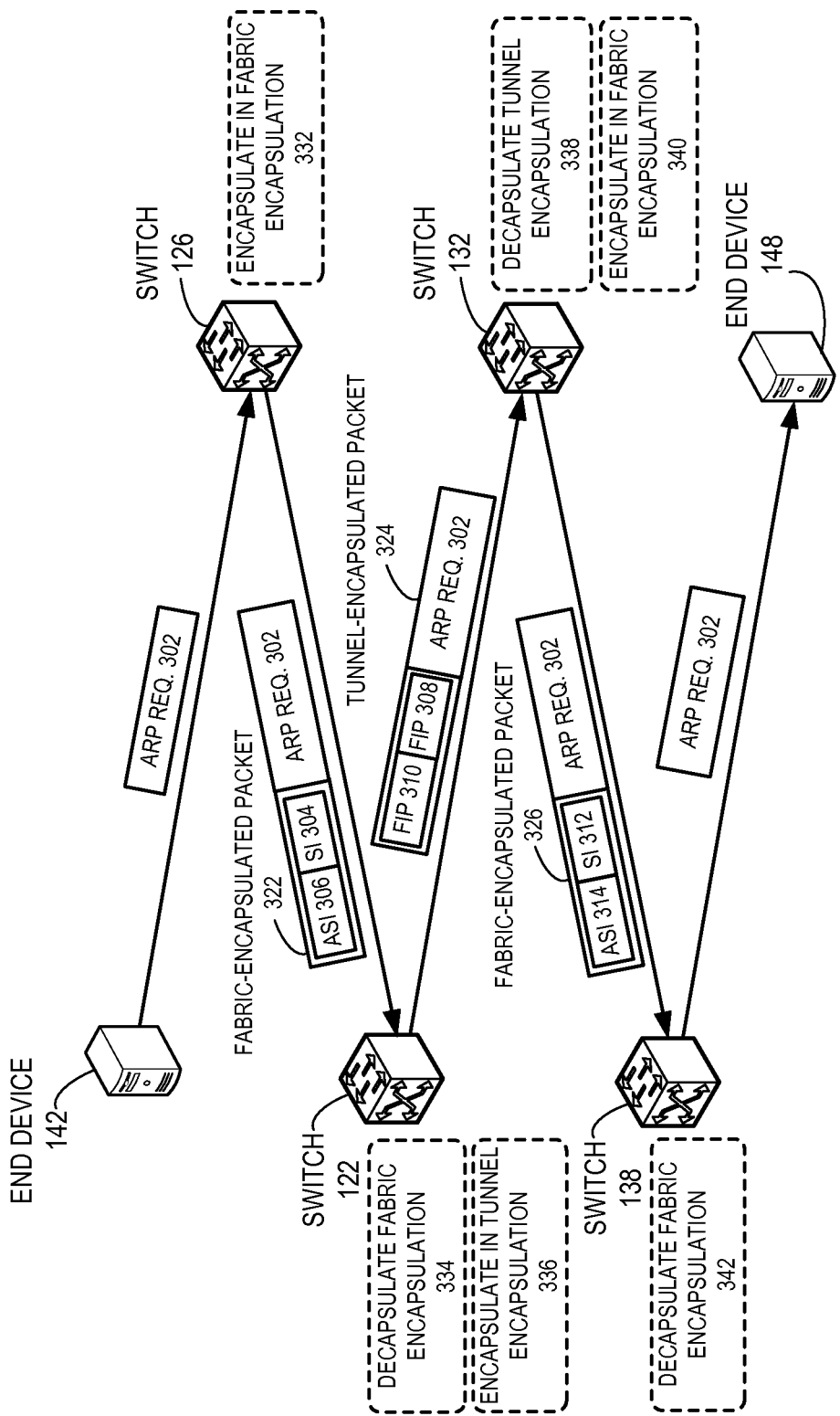
FIG. 3A illustrates an exemplary forwarding of an Address Resolution Protocol (ARP) request in an extended fabric switch, in accordance with an embodiment of the present invention.

FIG. 3A illustrates an exemplary forwarding of an ARP request in an extended fabric switch, in accordance with an embodiment of the present invention. During operation, end device 142 initiates a communication with end device 148 and sends an ARP request 302 (which can also be referred to as ARP query 302) comprising the IP address of end device 148. Edge switch 126 receives ARP request 302 via an edge port. Switch 126 learns the MAC address of end device 142 and adds the MAC address to its local MAC table (can also be referred to as a forwarding table) in association with the edge port (e.g., based on a port identifier). Switch 126 also generates a notification message comprising the learned MAC address and sends the notification message to switches 122, 124, and 128. In turn, switches 122, 124, and 128 learn the MAC address of end device 142 and add the MAC address to their respective local MAC tables in association with switch identifier 304 (e.g., an RBridge identifier or an IP address) of switch 126. In some embodiments, switches 122, 124, and 128 further associate the MAC address of end device 142 with the edge port of switch 126 (e.g., based on a port identifier).

Switch 126 encapsulates ARP request 302 with a fabric encapsulation (e.g., TRILL or IP encapsulation) to create fabric-encapsulated packet 322 (operation 332). Since switch 126 does not know the destination (i.e., has not learned the destination MAC address), switch 126 assigns an "all-switch" switch identifier 306 as the egress switch identifier and switch identifier 304 of switch 126 as the ingress switch identifier of the encapsulation header. Switch 126 forwards packet 322 to a respective switch in fabric switch 120. It should be noted that forwarding includes determining an egress (or output) port associated with the destination address and transmitting via the determined egress port.

When packet 322 reaches extension switch 122, switch 122 decapsulates packet 322 to extract ARP request 302 (operation 334). Since switch 122 has already discovered neighbor fabric switch 130, switch 122 encapsulates ARP request 302 with a tunnel encapsulation corresponding to tunnel mesh 102 to generate tunnel-encapsulated packet 324 (operation 336). It should be noted that an encapsulation (e.g., a tunnel or fabric encapsulation) includes encapsulating the packet (e.g., ARP request 302) in an encapsulation header corresponding to the encapsulation. Switch 122 assigns fabric IP address 310 of fabric switch 130 as the destination address and fabric IP address 308 of fabric switch 120 as the source address of the encapsulation header. Switch 122 forwards packet 324 to fabric switch 130 via layer-3 device 112 or 114, as described in conjunction with FIG. 1.

It should be noted that upon learning the MAC address of end device 142, switch 122 can send a notification message to switches 132 and 134. Upon receiving the notification message, switches 132 and 134 stores the MAC address of end device 142 in association with fabric IP address 308. Since fabric IP address 310 is a floating IP address, switch 132 or 134 can terminate forwarding of packet 324. Suppose that switch 132 receives packet 324, terminates forwarding, and decapsulates the tunnel encapsulation to extract ARP request 302 (operation 338). Switch 132 can also learn the MAC address of end device 142 from ARP request 302. Switch 132 can also determine whether any local end device (i.e., coupled with switch 132) corresponds to the IP address in ARP request 302.

Switch 132 then encapsulates ARP request 302 with a fabric encapsulation to create fabric-encapsulated packet 326 (operation 340). Since switch 132 does not know the destination (i.e., has not learned the destination MAC address), switch 132 assigns an "all-switch" switch identifier 314 (which can be the same as identifier 306) as the egress switch identifier and switch identifier 312 of switch 132 as the ingress switch identifier of the encapsulation header. Switch 132 forwards packet 326 to a respective switch in fabric switch 130. Upon receiving packet 326, switch 138 decapsulates the fabric encapsulation to extract ARP request 302 (operation 342). Switch 138 learns the MAC address of end device 142 and stores the learned MAC address in association with switch identifier 312 of switch 132. Switch 138 can flood its local edge ports with ARP request 302. End device 148 thus receives ARP request 302 and learns MAC address of end device 142. End device 148 determines that the IP address in ARP request 302 is assigned to end device 148 and generates an ARP response comprising the MAC address of end device 148.

Figure 3B:
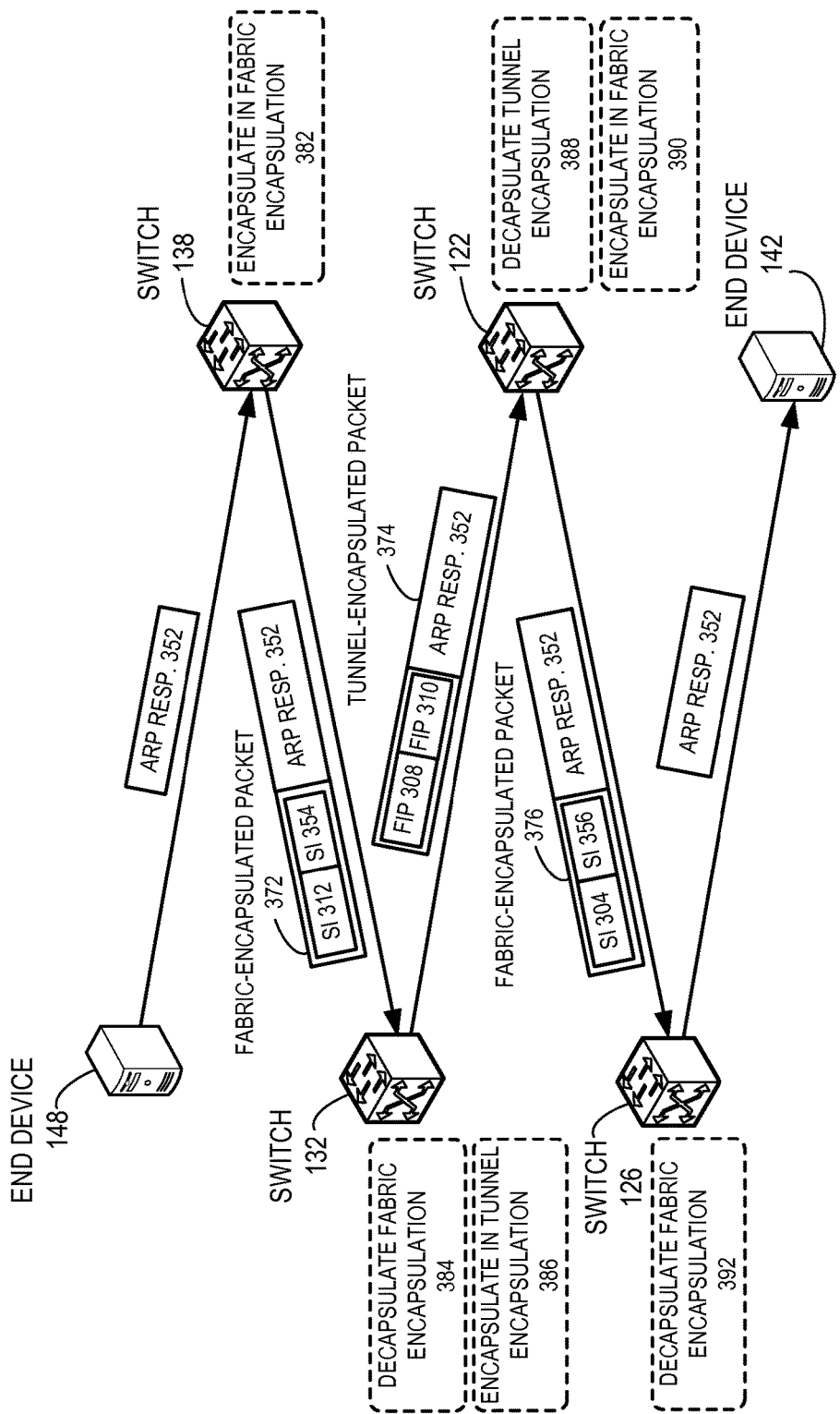
FIG. 3B illustrates an exemplary forwarding of an ARP response among in an extended fabric switch, in accordance with an embodiment of the present invention.

FIG. 3B illustrates an exemplary forwarding of an ARP response among in an extended fabric switch, in accordance with an embodiment of the present invention. During operation, end device 148 generates and sends an ARP response 352 responding to ARP request 302. The destination MAC address of ARP response 352 corresponds to end device 142. Edge switch 138 receives ARP response 352 via an edge port. Switch 138 learns the MAC address of end device 148 and adds the MAC address to its local MAC table in association with the edge port. Switch 138 also generates a notification message comprising the learned MAC address and sends the notification message to switches 132, 134, and 136. In turn, switches 132, 134, and 138 learn the MAC address of end device 148 and add the MAC address to their respective local MAC tables in association with switch identifier 354 (e.g., an RBridge identifier or an IP address) of switch 138. In some embodiments, switches 132, 134, and 136 further associate the MAC address of end device 148 with the edge port of switch 138.

Switch 138 encapsulates ARP response 352 with a fabric encapsulation (e.g., TRILL or IP encapsulation) to create fabric-encapsulated packet 372 (operation 382). Since switch 138 already knows the destination MAC address, which is associated with switch identifier 312 of switch 132, switch 138 assigns switch identifier 312 as the egress switch identifier and switch identifier 354 of switch 138 as the ingress switch identifier of the encapsulation header. Switch 138 forwards packet 372 to switch 132. When packet 372 reaches switch 132, switch 132 decapsulates packet 372 to extract ARP response 352 (operation 384). Since switch 132 has stored the MAC address of end device 142 in association with fabric IP address 308, switch 122 encapsulates ARP response 352 with a tunnel encapsulation corresponding to tunnel mesh 102 to generate tunnel-encapsulated packet 374 (operation 386). Switch 132 assigns fabric IP address 308 as the destination address and fabric IP address 310 as the source address of the encapsulation header. Switch 132 forwards packet 374 to fabric switch 120 via layer-3 device 116 or 118, as described in conjunction with FIG. 1.

Since fabric IP address 308 is a floating IP address, switch 122 or 124 can terminate forwarding of packet 374. Suppose that switch 122 receives packet 374, terminates forwarding, and decapsulates the tunnel encapsulation to extract ARP response 352 (operation 388). Switch 122 then encapsulates ARP response 352 with a fabric encapsulation to create fabric-encapsulated packet 376 (operation 390). Since switch 122 stores the MAC address in association with switch identifier 304, switch 122 assigns switch identifier 304 as the egress switch identifier and switch identifier 356 of switch 122 as the ingress switch identifier of the encapsulation header. Switch 122 forwards packet 376 to switch 126 based on switch identifier 304. Upon receiving packet 376, switch 126 decapsulates the fabric encapsulation to extract ARP response 352 (operation 392). Switch 126 forwards ARP response 352 via the edge port coupling end device 148. End device 148 thus receives ARP response 352 and learns MAC address of end device 148.

MAC Sharing in Extended Fabric Switch

Figure 4A:
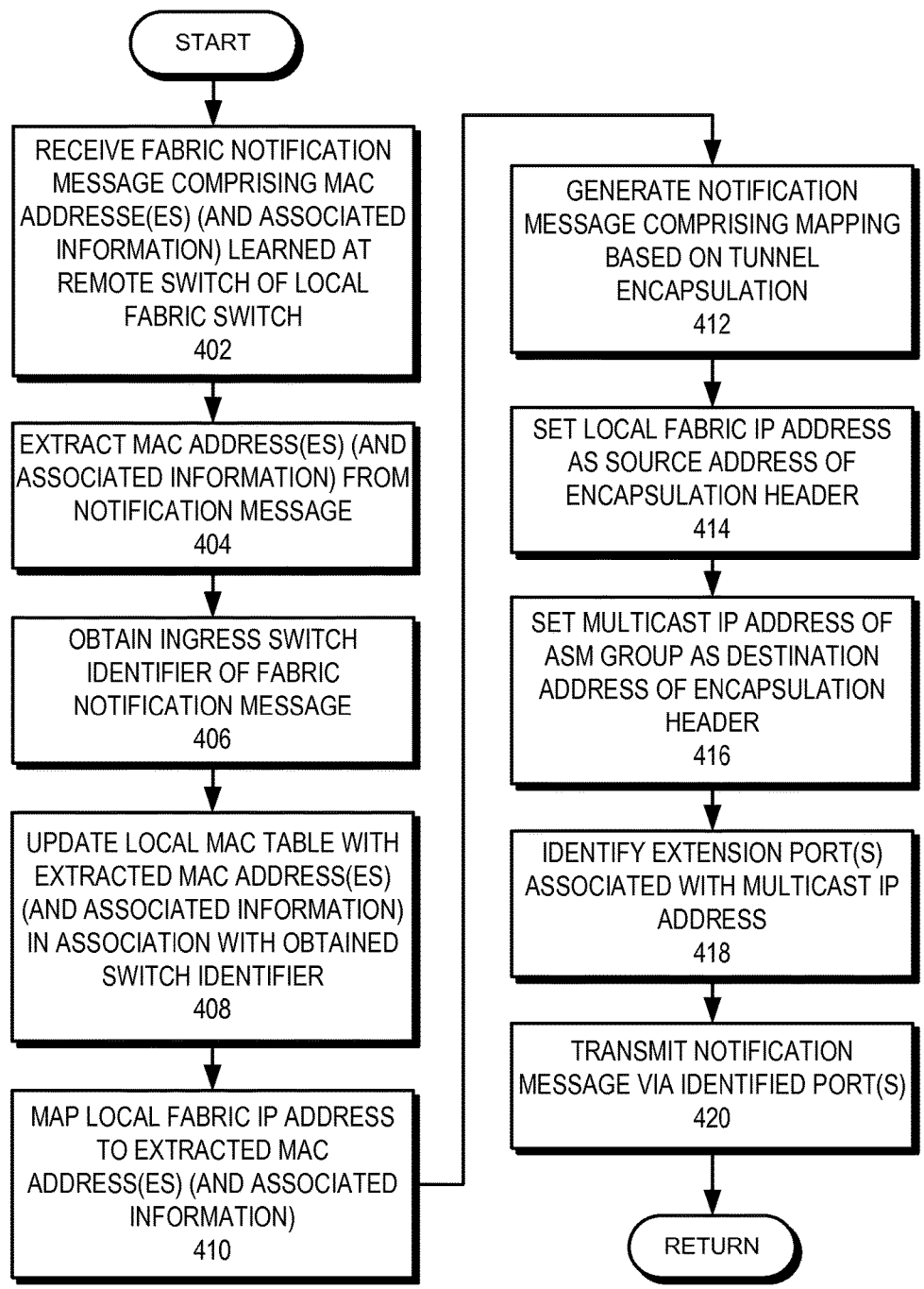
FIG. 4A presents a flowchart illustrating the process of an extension switch sharing learned media access control (MAC) addresses in an extended fabric switch, in accordance with an embodiment of the present invention.

FIG. 4A presents a flowchart illustrating the process of an extension switch sharing learned MAC addresses in an extended fabric switch, in accordance with an embodiment of the present invention. During operation, the extension switch receives a fabric notification message comprising one or more MAC address(es) (and associated information, such as corresponding VLAN tags) learned at a remote switch of the local fabric switch (operation 402). In some embodiments, the fabric notification message is based on an internal messaging service of the fabric switch. The extension switch extracts the MAC address(es) (and associated information) from the notification message (operation 404) and obtains the ingress switch identifier of the fabric notification message (operation 406). The extension switch updates the local MAC table with the extracted MAC address(es) (and associated information) in association with the obtained switch identifier (operation 408).

The extension switch also maps the local fabric IP address to extracted MAC address(es) (and associated information) (operation 410) and generate a notification message comprising the mapping based on a tunnel encapsulation (e.g., VXLAN encapsulation) (operation 412). The extension switch sets the local fabric IP address as the source address of the encapsulation header (e.g., VXLAN header) (operation 414). The extension switch sets the multicast IP address of the ASM group as the destination address of the encapsulation header (operation 416). The extension switch then identifies the extension port(s) associated with the multicast IP address (operation 418) and transmits the notification message via the identified port(s) (operation 420).

Figure 4B:
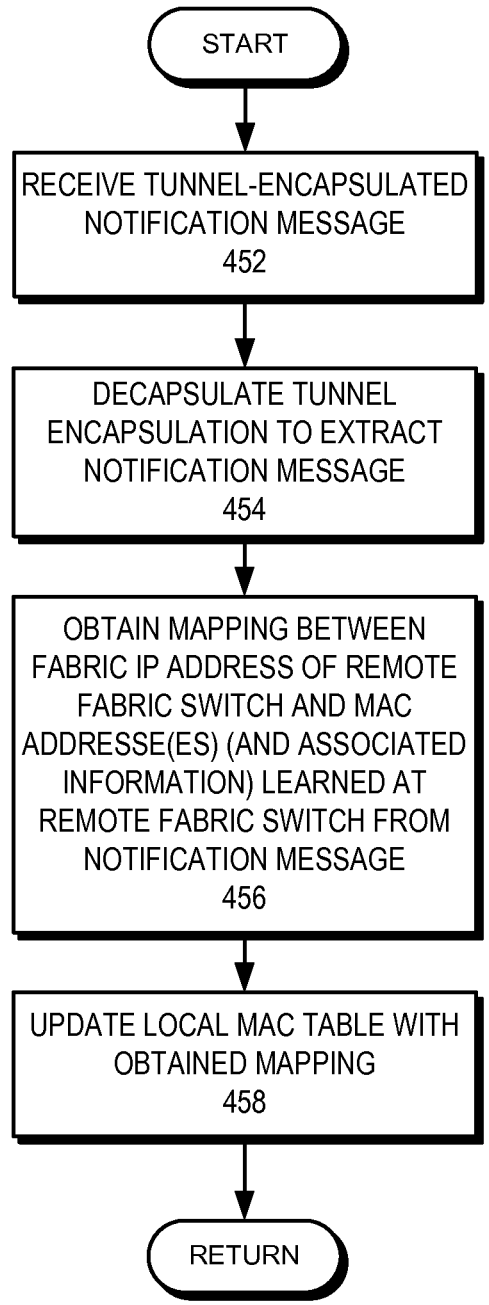
FIG. 4B presents a flowchart illustrating the process of an extension switch learning MAC addresses from a neighbor fabric switch, in accordance with an embodiment of the present invention.

FIG. 4B presents a flowchart illustrating the process of an extension switch learning MAC addresses from a neighbor fabric switch, in accordance with an embodiment of the present invention. During operation, the extension switch receives a tunnel-encapsulated notification message (operation 452) and decapsulates the tunnel encapsulation to extract the notification message (operation 454). The extension switch obtains a mapping between a fabric IP address of a remote fabric switch and MAC address(es) (and associated information) learned at the remote fabric switch from the notification message (operation 456). The extension switch updates its local MAC table with the obtained mapping (operation 458).

Data Forwarding

Figure 5A:
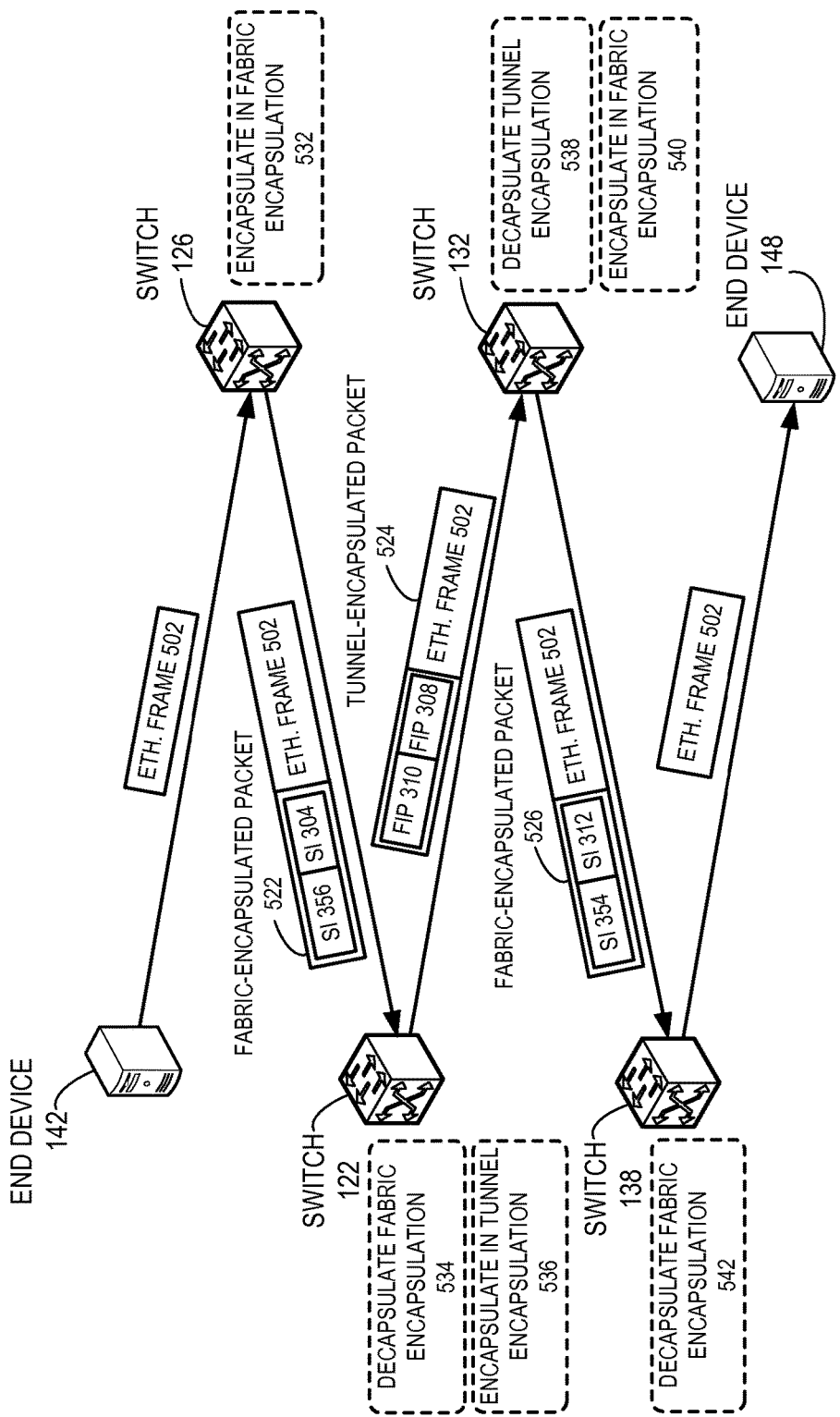
FIG. 5A illustrates an exemplary forwarding of a data packet in an extended fabric switch, in accordance with an embodiment of the present invention.

FIG. 5A illustrates an exemplary forwarding of a data packet in an extended fabric switch, in accordance with an embodiment of the present invention. During operation, end device 142 initiates a communication with end device 148 and sends an Ethernet frame 502 destined to end device 148. Edge switch 126 receives Ethernet frame 502 via an edge port. Suppose that switch 126 has already learned and stored the MAC address of end device 148 in association with switch 122, as described in conjunction with FIG. 3A. Switch 126 encapsulates Ethernet frame 502 with a fabric encapsulation (e.g., TRILL or IP encapsulation) to create fabric-encapsulated packet 522 (operation 532). Since switch 126 knows the destination MAC address, switch 126 assigns switch identifier 356 of switch 122 as the egress switch identifier and switch identifier 304 of switch 126 as the ingress switch identifier of the encapsulation header. Switch 126 forwards packet 522 to switch 122 based on switch identifier 356.

When packet 522 reaches extension switch 122, switch 122 decapsulates packet 522 to extract Ethernet frame 502 (operation 534). Since switch 122 has already discovered neighbor fabric switch 130, switch 122 encapsulates Ethernet frame 502 with a tunnel encapsulation corresponding to tunnel mesh 102 to generate tunnel-encapsulated packet 524 (operation 536). Switch 122 assigns fabric IP address 310 of fabric switch 130 as the destination address and fabric IP address 308 of fabric switch 120 as the source address of the encapsulation header. Switch 122 forwards packet 524 to fabric switch 130 via layer-3 device 112 or 114, as described in conjunction with FIG. 1.

Since fabric IP address 310 is a floating IP address, switch 132 or 134 can terminate forwarding of packet 524. Suppose that switch 132 receives packet 524, terminates forwarding, and decapsulates the tunnel encapsulation to extract Ethernet frame 502 (operation 538). Switch 132 then encapsulates Ethernet frame 502 with a fabric encapsulation to create fabric-encapsulated packet 526 (operation 540). Since switch 132 knows the destination MAC address, switch 132 assigns switch identifier 354 of switch 138 as the egress switch identifier and switch identifier 312 of switch 132 as the ingress switch identifier of the encapsulation header. Switch 132 forwards packet 526 to switch 138 based on switch identifier 354. Upon receiving packet 526, switch 138 decapsulates the fabric encapsulation to extract Ethernet frame 502 (operation 542). Switch 126 forwards Ethernet frame 502 via the edge port coupling end device 148. End device 148 thus receives Ethernet frame 502 sent from end device 142.

Figure 5B:
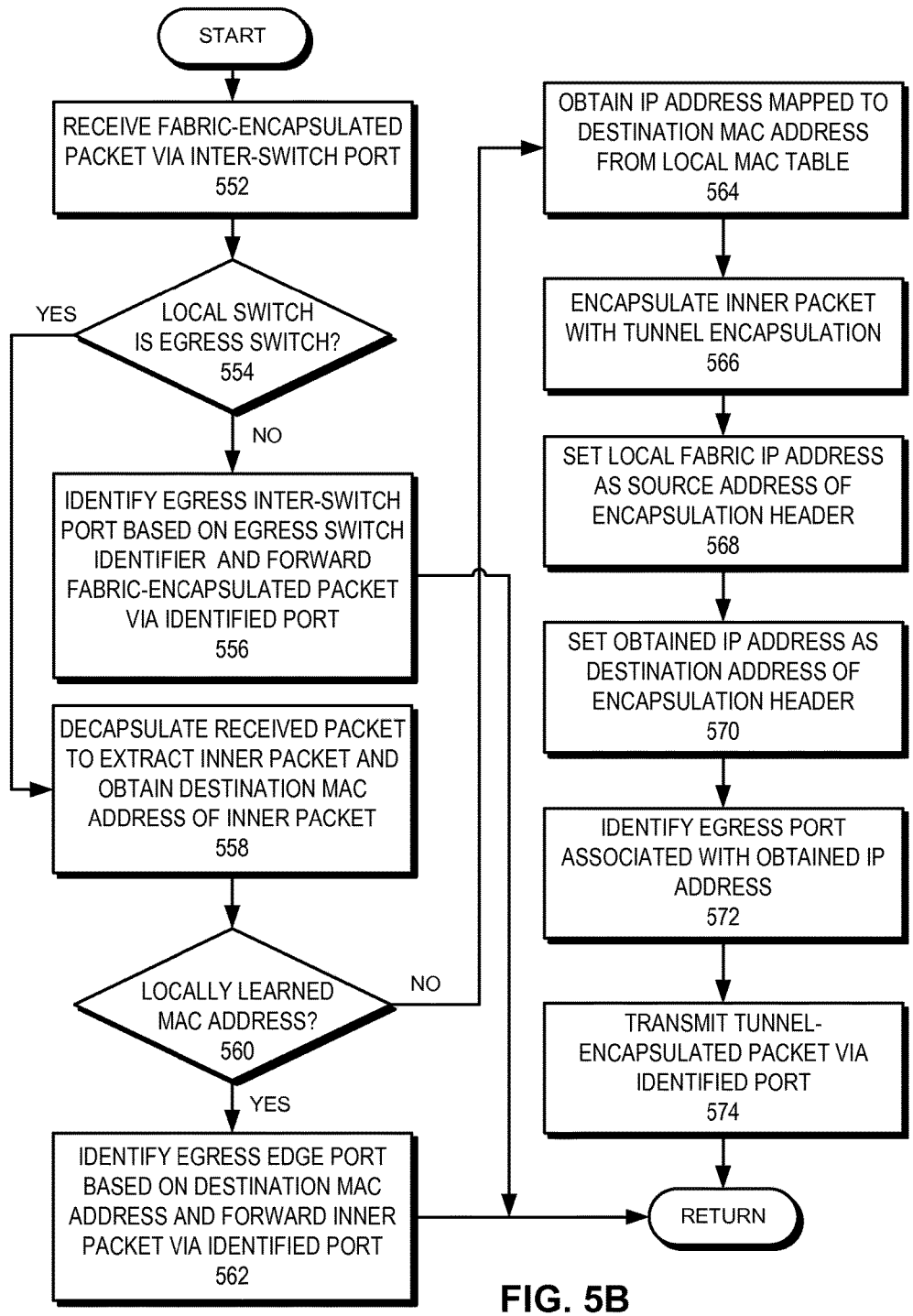
FIG. 5B presents a flowchart illustrating the process of an extension switch forwarding a data packet to a neighbor fabric switch, in accordance with an embodiment of the present invention.

FIG. 5B presents a flowchart illustrating the process of an extension switch forwarding a data packet to a neighbor fabric switch, in accordance with an embodiment of the present invention. During operation, the extension switch receives a fabric-encapsulated packet via a local inter-switch port (operation 552). The extension switch checks whether the local switch is the egress switch for the packet (operation 554). If the local switch is not the egress switch, the extension switch identifies an egress inter-switch port for the packet based on the egress switch identifier and forwards the fabric-encapsulated packet via the identified port (operation 556). Otherwise, the extension switch decapsulates the received packet to extract the inner packet (e.g., an Ethernet frame) and obtains the destination MAC address of the inner packet (operation 558).

The extension switch then checks whether the destination MAC address is a locally learned MAC address (operation 560). If the destination MAC address is a locally learned MAC address, the extension switch identifies an egress edge port based on the destination MAC address (e.g., from a local MAC table) and forwards the inner packet via the identified port (operation 562). Otherwise, the extension switch obtains the IP address mapped to the destination MAC address from the local MAC table (operation 564). In some embodiments, the destination MAC address is mapped to a tunnel identifier, which is associated with the IP address. The MAC address can be further mapped with a VLAN tag in the local MAC table. The extension switch encapsulates the inner packet in a tunnel encapsulation (e.g., VXLAN encapsulation) (operation 566), as described in conjunction with FIG. 5A.

The extension switch sets the local fabric IP address as the source address of the encapsulation header (e.g., a VXLAN header) (operation 568). The extension switch sets the obtained IP address as the destination address of the encapsulation header (operation 570). The extension switch then identifies the extension port associated with the obtained IP address (operation 572) and transmits the tunnel-encapsulated packet via the identified port (operation 574).

Figure 5C:
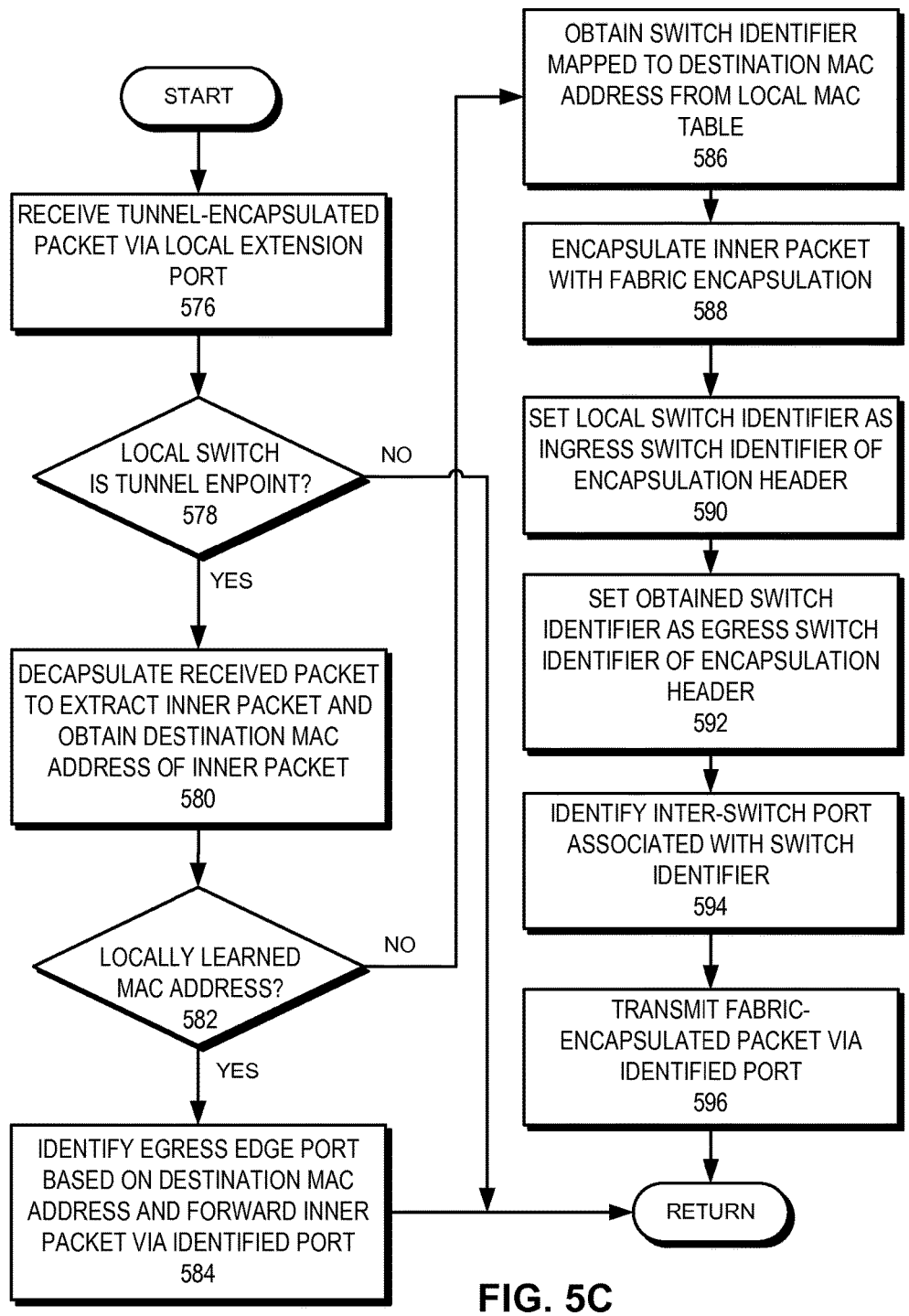
FIG. 5C presents a flowchart illustrating the process of an extension switch receiving a data packet from a neighbor fabric switch, in accordance with an embodiment of the present invention.

FIG. 5C presents a flowchart illustrating the process of an extension switch receiving a data packet from a neighbor fabric switch, in accordance with an embodiment of the present invention. During operation, the extension switch receives a tunnel-encapsulated packet via a local extension port (operation 576) and checks whether the local switch is the tunnel endpoint (operation 578). In some embodiments, the local switch is the tunnel endpoint if the destination address of the encapsulation header is a local fabric IP address. If the local switch is the tunnel endpoint, the extension switch decapsulates the received packet to extract the inner packet and obtains the destination MAC address of the inner packet (operation 580).

The extension switch then checks whether the destination MAC address is a locally learned MAC address (operation 582). If the destination MAC address is a locally learned MAC address, the extension switch identifies an egress edge port based on the destination MAC address (e.g., from a local MAC table) and forwards the inner packet via the identified port (operation 584). In some embodiments, the egress edge port is further selected based on a VLAN tag. If the destination MAC address is not a locally learned MAC address, the extension switch obtains a switch identifier mapped to the destination MAC address from the local MAC table (operation 586). The switch identifier can be further mapped to a VLAN tag.

The extension switch encapsulates the inner packet with a fabric encapsulation (e.g., TRILL encapsulation) (operation 588), as described in conjunction with FIG. 5A. The extension switch sets the local switch identifier as the ingress switch identifier of the encapsulation header (e.g., a TRILL header) (operation 590). The extension switch sets the obtained switch identifier as the egress switch identifier of the encapsulation header (operation 592). The extension switch then identifies the inter-switch port associated with the obtained switch identifier (operation 594) and transmits the fabric-encapsulated packet via the identified port (operation 596).

Virtual Machine Management

Figure 6A:
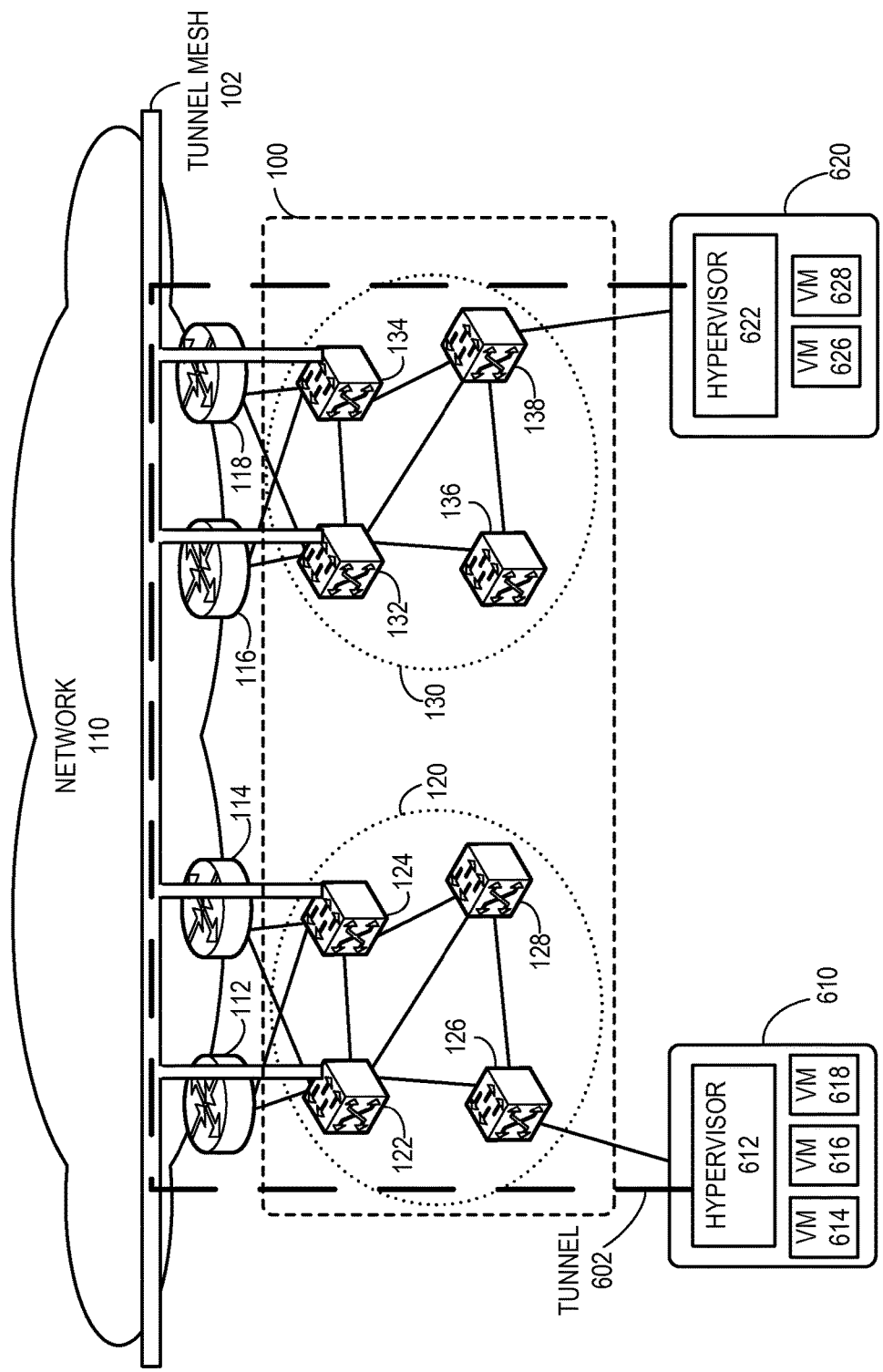
FIG. 6A illustrates exemplary coupling of virtual machines to an extended fabric switch, in accordance with an embodiment of the present invention.

FIG. 6A illustrates exemplary coupling of virtual machines to an extended fabric switch, in accordance with an embodiment of the present invention. Extended fabric switch 100 can couple virtual machines in one or more datacenters. To do so, extended fabric switch 100 facilitates communication and migration for virtual machines in different datacenters. In this example, host machine (which is an end device) 610 is coupled to switch 126. Host machine 610 hosts a hypervisor 612 which runs virtual machines 614, 616, and 618 on host machine 610. Similarly, host machine 620 is coupled to switch 138. Host machine 620 hosts a hypervisor 622 which runs virtual machines 626 and 628 on host machine 620.

In some embodiments, a respective member switch of extended fabric switch 100 can facilitate tunneling (i.e., can operate as a tunnel endpoint and forward tunnel-encapsulated packets). Suppose that hypervisors 612 and 622 can also operate as tunnel endpoints. During operation, virtual machine 614 initiates communication with virtual machine 626 and sends a packet to hypervisor 612. Hypervisors 612 and 622 can be configured with each other's IP addresses and learn each other's MAC addresses based on ARP resolution, as described in conjunction with FIGS. 3A and 3B. To enable communication between virtual machines 614 and 626, hypervisor 612 establishes a tunnel 602 with hypervisor 622 via extension switches 122 and 134. Hypervisor 612 encapsulates the packet from virtual machine 614 with a tunnel encapsulation corresponding to tunnel mesh 102. The source and destination addresses of this encapsulation header are IP addresses of hypervisors 612 and 614, respectively.

Hypervisor 612 assigns the MAC address of switch 122 as the next hop MAC address of the tunnel encapsulation and sends the packet. The packet is received by switch 122. Switch 122 further encapsulates the packet in another tunnel encapsulation corresponding to tunnel mesh 102. The source and destination addresses of this encapsulation header is the fabric IP addresses of fabric switches 120 and 130, respectively. Switch 122 forwards the encapsulated packet via network 110. Switch 132 (or 134) receives the packet and decapsulates the outer tunnel encapsulation. Switch 132 then looks up the destination IP address of the inner encapsulation and forwards the tunnel-encapsulated packet to hypervisor 622. Upon receiving the packet, hypervisor 620 decapsulates the tunnel encapsulation and delivers the inner packet to virtual machine 626.

Suppose that hypervisors 612 and 622 do not operate as tunnel endpoints. Under such a scenario, virtual machine 614 sends a packet (e.g., an Ethernet frame) to hypervisor 612. Hypervisor 612 receives the packet and sends the packet to switch 126, which in turn, encapsulates the packet with a fabric encapsulation and forwards the fabric-encapsulated packet to switch 122. Switch 122 decapsulates the fabric encapsulation, encapsulates the packet with a tunnel encapsulation, and forwards the fabric-encapsulated packet via network 110. Switch 132 receives the packet, decapsulates the tunnel encapsulation, encapsulates the packet in fabric encapsulation, and forwards via fabric switch 130, as described in conjunction with FIG. 5A Switch 138 receives the fabric-encapsulated packet, decapsulates the fabric encapsulation, and forwards via a local edge port which couples host machine 620. Hypervisor 622 receives the packet and delivers the packet to virtual machine 626.

Figure 6B:
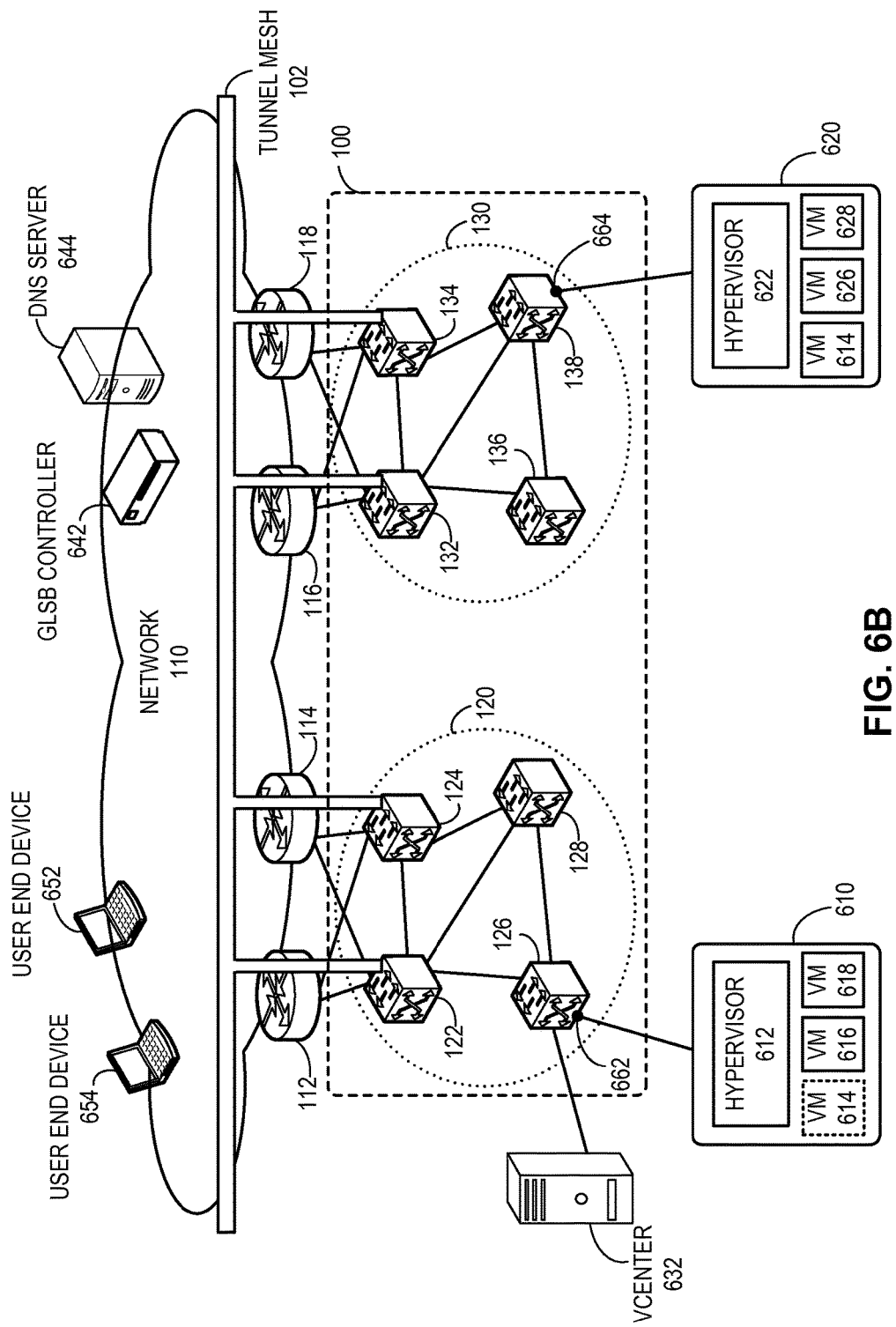
FIG. 6B illustrates an exemplary migration of a virtual machine across neighbor fabric switches, in accordance with an embodiment of the present invention.

FIG. 6B illustrates an exemplary migration of a virtual machine across neighbor fabric switches, in accordance with an embodiment of the present invention. In the example in FIG. 6B, VCenter 632 manages virtual machine migrations for the datacenter comprising fabric switch 120. During operation, virtual machine 614 is in communication (e.g., has an ongoing Transport Control Protocol (TCP) connection) with a user end device 652. Suppose that virtual machine 614 migrates to host machine 620 (denoted with dashed lines). In some embodiments, VCenter 632 manages the migration and notifies a Global Server Load Balancing (GSLB) controller 642. GSLB controller 642 balances load for virtual machines on host machines 610 and 620. GSLB controller 642 updates a Domain Name Service (DNS) server 644 regarding the migration and its associated updates (e.g., a new IP address in the IP subnet of host machine 620).

In some embodiments, extension switches of extended fabric switch 100 are aware of the migrated virtual machines (e.g., based on a notification from VCenter 632). Since end device 652 is in communication with virtual machine 614, end device 652 continues to forward packets to fabric switch 120. Extension switch 122 (or 124) receives such a packet, encapsulates it with a tunnel encapsulation corresponding to tunnel mesh 102, and forwards the tunnel-encapsulated packet to fabric IP address 310 of fabric switch 130. Switch 132 (or 134) receives the packet, identifies fabric IP address 310 as the destination address of the encapsulation header, and decapsulates the tunnel encapsulation.

Switch 132 encapsulates the packet with a fabric encapsulation and forwards the fabric-encapsulated packet to switch 138, which, in turn, decapsulates the fabric encapsulation and forwards the packet to hypervisor 622 in host machine 620. Hypervisor 622 delivers the packet to virtual machine 614. In this way, even when virtual machine 614 migrates across datacenters, existing connections can continue to operate. On the other hand, when a user end device 654 initiates a new connection and queries DNS server 644 for the location of virtual machine 614, the response from DNS server 644 points to the new location (e.g., a new IP address) of virtual machine 614. As a result, end device 654 sends packets to fabric switch 130 via layer-3 device 132 or 134.

In some embodiments, a respective member switch of a fabric switch includes a set of port profiles. A port profile includes configurations of a port. Examples of such configuration include, but are not limited to, Quality of Service (QoS) configuration, VLAN configuration, security configuration, and network configuration (e.g., FC configuration). A port profile is associated with one or more MAC addresses. When a switch identifies a MAC address as a source address in an Ethernet header of an Ethernet frame, the switch applies the corresponding port profile to the ingress port of the Ethernet frame. For example, suppose that a port profile is associated with the MAC addresses of virtual machines 614 and 616. Upon receiving an Ethernet frame from virtual machine 616 via port 662, switch 126 identifies the MAC address of virtual machine 616 as the source MAC address of the Ethernet header and applies the corresponding port profile to port 662.

In some embodiments, the port profiles are synchronized in extended fabric switch 100. For example, extension switches 122 and 124 synchronize the port profiles of fabric switch 120 with extension switches 132 and 134. Similarly, extension switches 132 and 134 synchronize the port profiles of fabric switch 130 with extension switches 122 and 124. In this way, the port profiles of fabric switches 120 and 130 are available in both fabric switches. After virtual machine 614 migrates to host machine 620, switch 138 receives an Ethernet frame from virtual machine 614 via port 664. Since the port profiles are synchronized in extended fabric switch 100, the port profile associated with the MAC address of virtual machine 614 is available in the member switches of fabric switch 130. Switch 138 identifies the MAC address of virtual machine 614 as the source MAC address of the Ethernet header and applies the corresponding port profile to port 664.

VRRP Localization

Figure 7:
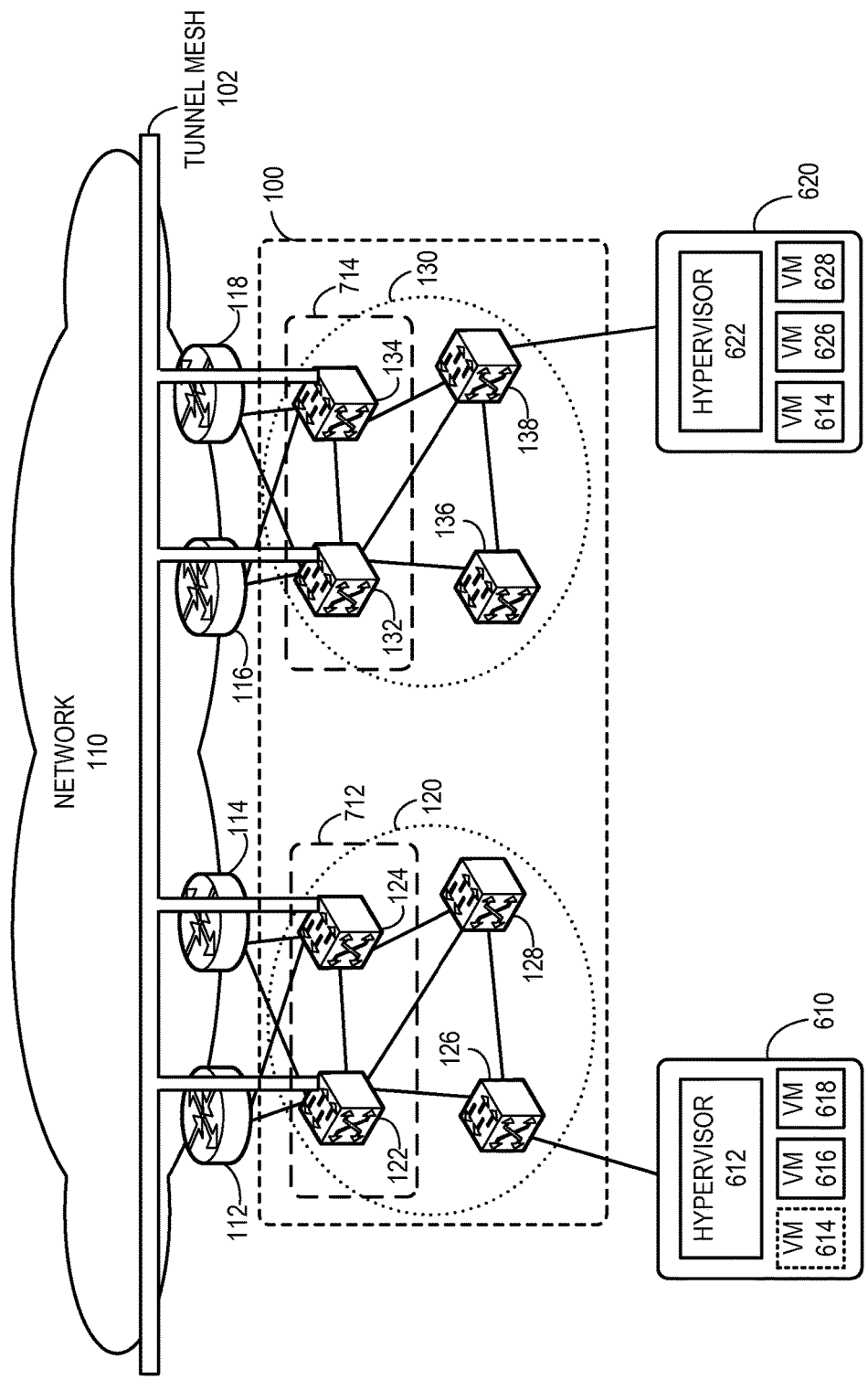
FIG. 7 illustrates an exemplary Virtual Router Redundancy Protocol (VRRP) localization in an extended fabric switch, in accordance with an embodiment of the present invention.

FIG. 7 illustrates an exemplary VRRP localization in an extended fabric switch, in accordance with an embodiment of the present invention. Suppose that switches 122 and 124 operate as VRRP forwarders 712 for fabric switch 120. Switches 122 and 124 can operate as an active and a standby VRRP forwarder, respectively. Similarly, switches 132 and 134 operate as VRRP forwarders 714 for fabric switch 130. Switches 132 and 134 can operate as an active and a standby VRRP forwarder, respectively. Operations of VRRP are described in IETF RFC "Virtual Router Redundancy Protocol (VRRP)," available at http://tools.ietf.org/html/rfc3768, which is incorporated by reference herein.

Without VRRP localization, when virtual machine 614 migrates to host machine 620, switch 122 still remains the active forwarder for virtual machine 614. As a result, virtual machine 614 continues to use the IP address of VRRP forwarders 712 as the gateway IP address and forwards packets based on a corresponding MAC address. When switch 138 receives a packet from virtual machine 614, switch 138 forwards the packet to extension switch 134, which, in turn, encapsulates the packet with a tunnel encapsulation and forwards the tunnel-encapsulated packet to fabric IP address 308 of fabric switch 120. Extension switch 122 receives the tunnel-encapsulated packet, decapsulates the tunnel encapsulation, and forwards the inner packet from virtual machine 614.

To solve this problem, VRRP forwarders are localized in extended fabric switch 100. As a result, VRRP forwarders 712 operate for the end devices coupled to fabric switch 120 (e.g., virtual machines in host machine 610), and VRRP forwarders 714 operate for the end devices coupled to fabric switch 130 (e.g., virtual machines in host machine 620). Upon completion of the migration of virtual machine 614, extension switch 132 notifies virtual machine 614 that the active forwarder has been updated. Virtual machine 614 then updates the MAC address of the default gateway and continues forwarding via the local VRRP forwarders 714.

Work Load Management

Figure 8:
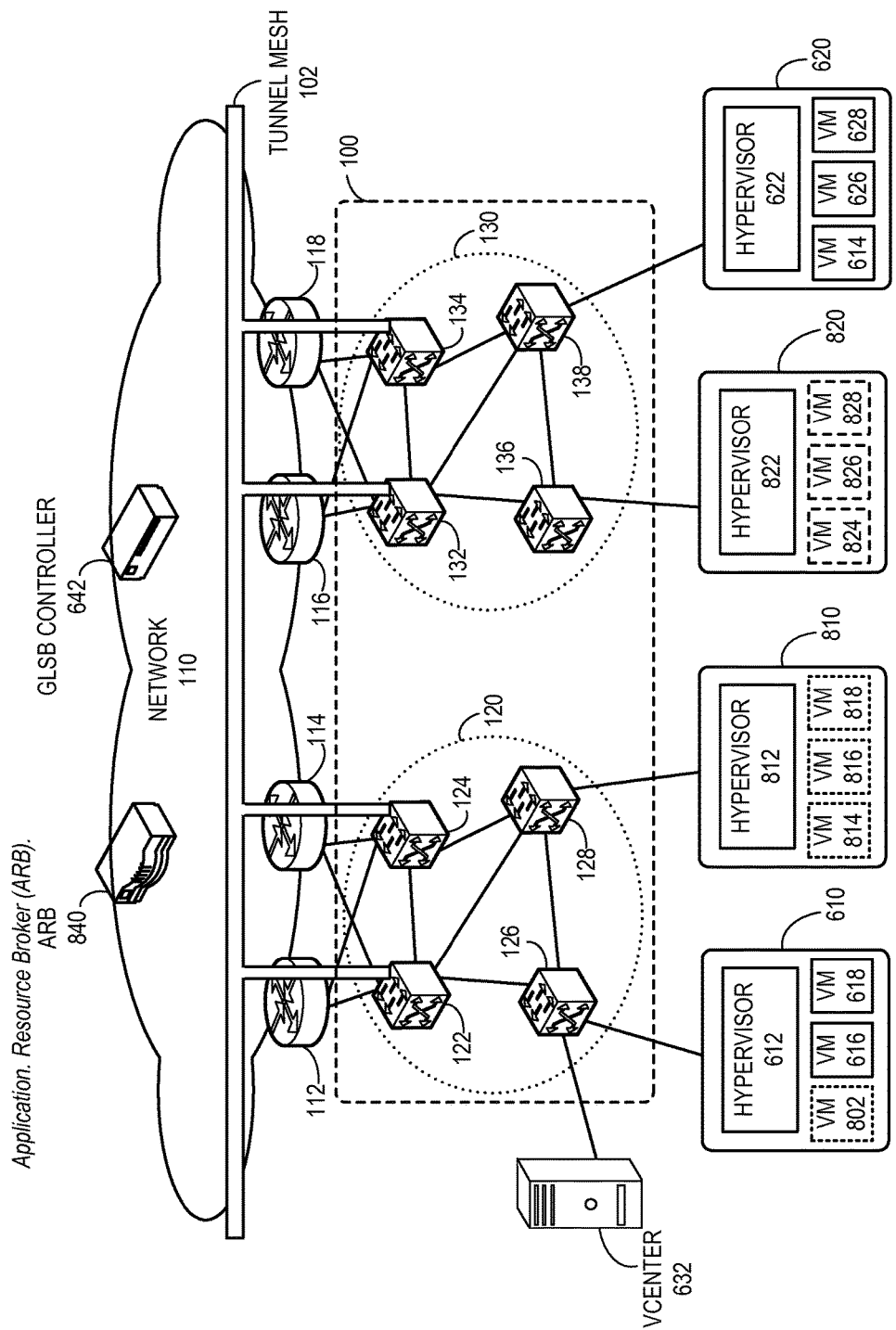
FIG. 8 illustrates an exemplary work load management in an extended fabric switch, in accordance with an embodiment of the present invention.

FIG. 8 illustrates an exemplary work load management in an extended fabric switch, in accordance with an embodiment of the present invention. In this example, an Application Resource Broker (ARB) 840 monitors the workload on the virtual machines coupled to fabric switches 120 and 130. If the load on the virtual machines coupled to fabric switch 120 reaches a threshold, ARB 840 can instruct VCenter 632 to create more virtual machines. For example, virtual machine 802 can be created to run on hypervisor 612 in host machine 610 coupled to switch 126, and virtual machines 814, 816, and 818 can be created to run on hypervisor 812 in host machine 810 coupled to switch 128 (denoted with dotted lines). The load on the virtual machines coupled to fabric switch 120 can continue to increase. However, host machines coupled to fabric switch 120 may not have enough computing resources.

To solve this problem, ARB 840 is allowed to monitor and mange the workload of extended fabric switch 100 together. As a result, when the load on the virtual machines coupled to fabric switch 120 continues to increase but host machines coupled to fabric switch 120 do not have enough computing resources, virtual machines can be created in host machines coupled to fabric switch 130. For example, virtual machines 824, 826, and 828 can be created to run on hypervisor 822 in host machine 820 coupled to switch 136 (denoted with dashed lines). Since extension switches of extended fabric switch 100 allows communication between the virtual machines, virtual machines 824, 826, and 828 can share configuration (e.g., same VLAN tag) with virtual machines 802, 814, 816, and 818.

Direct Forwarding

Figure 9:
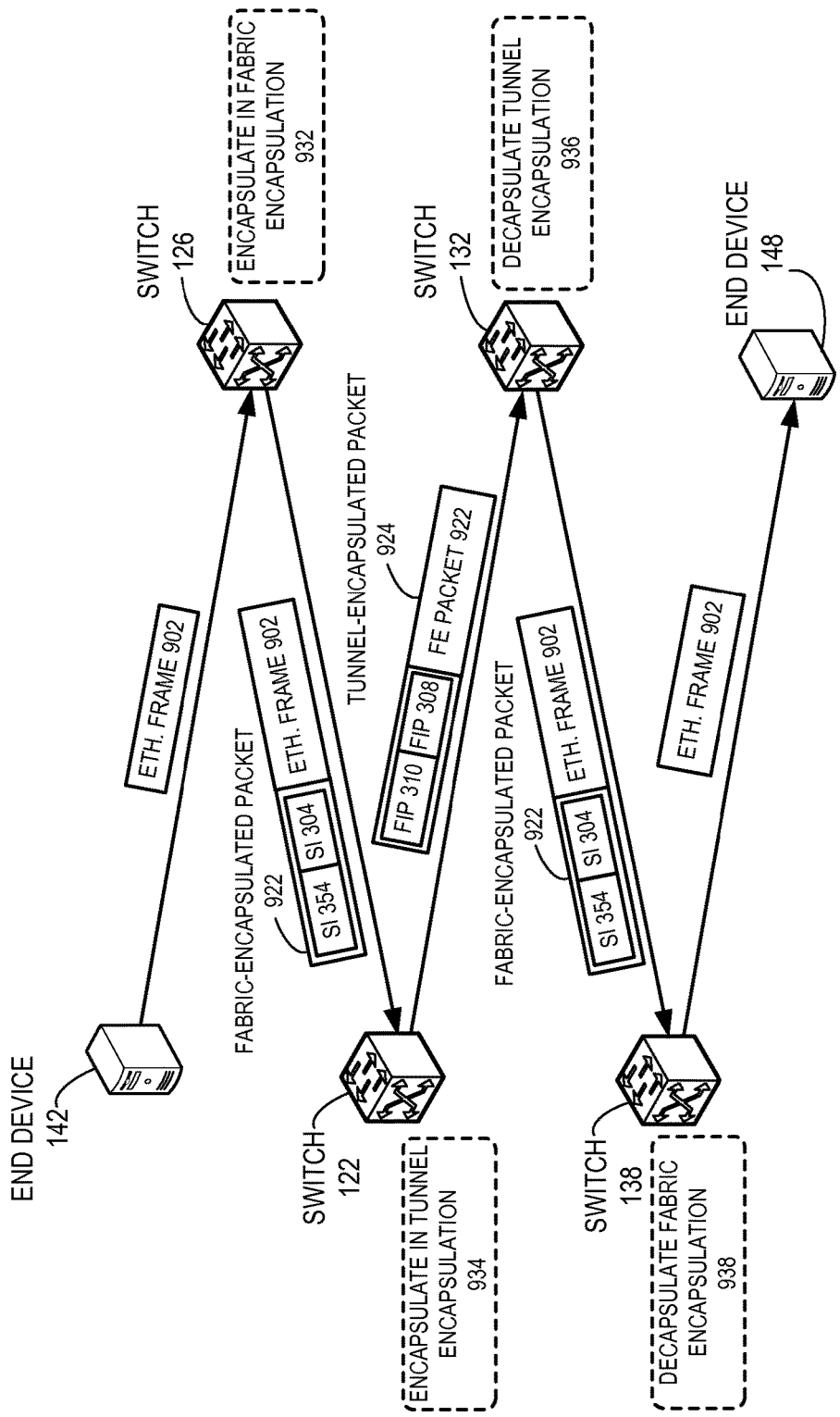
FIG. 9 illustrates an exemplary direct forwarding of a data packet in an extended fabric switch, in accordance with an embodiment of the present invention.

FIG. 9 illustrates an exemplary direct forwarding of a data packet in an extended fabric switch, in accordance with an embodiment of the present invention. Direct forwarding allows fabric encapsulated packets to be directly forwarded without being decapsulated at the extension switches. A switch with direct forwarding support can forward in the local fabric switch a fabric-encapsulated packet encapsulated in a remote fabric switch. For example, if switch 132 supports direct forwarding, switch 132 can forward in fabric switch 130 a fabric-encapsulated packet encapsulated in fabric switch 120. In the example in FIG. 9, switches in extended fabric switch 100 support direct forwarding.

It should be noted that direct forwarding may require a unique switch identifier for a respective switch in an extended fabric switch. To facilitate direct forwarding, a MAC address learned from a neighbor fabric switch is stored in association with a switch identifier of the switch from which the MAC address has been learned. As a result, a respective switch can identify the egress switch identifier of a packet destined to that MAC address. When a switch receives a packet (e.g., an Ethernet frame) via a local edge port, the switch encapsulates the packet with a fabric encapsulation, and assigns the local and the identified switch identifiers as ingress and egress switch identifiers of the encapsulation header, respectively.

During operation, end device 142 initiates a communication with end device 148 and sends an Ethernet frame 902 destined to end device 148. Edge switch 126 receives Ethernet frame 902 via an edge port. Suppose that switch 126 has already learned and stored the MAC address of end device 148 in association with switch identifier 354 of switch 138. Switch 126 encapsulates Ethernet frame 902 with a fabric encapsulation (e.g., TRILL or IP encapsulation) to create fabric-encapsulated packet 922 (operation 932). Since switch 126 knows the destination MAC address, switch 126 assigns switch identifier 354 of switch 138 as the egress switch identifier and switch identifier 304 of switch 126 as the ingress switch identifier of the encapsulation header. Switch 126 forwards packet 922 to switch 122.

When packet 922 reaches extension switch 122, switch 122 encapsulates packet 922 in a tunnel encapsulation corresponding to tunnel mesh 102 to generate tunnel-encapsulated packet 924 (operation 934). Switch 122 assigns fabric IP address 310 of fabric switch 130 as the destination address and fabric IP address 308 of fabric switch 120 as the source address of the encapsulation header. Switch 122 forwards packet 924 to fabric switch 130 via layer-3 device 112 or 114, as described in conjunction with FIG. 1. Since fabric IP address 310 is a floating IP address, switch 132 or 134 can terminate forwarding of packet 924.

Suppose that switch 132 receives packet 924, terminates forwarding, and decapsulates the tunnel encapsulation to extract fabric-encapsulated packet 922 (operation 936). Switch 132 forwards packet 922 based on switch identifier 354 to switch 138. Upon receiving packet 922, switch 138 decapsulates the fabric encapsulation to extract Ethernet frame 902 (operation 938). Switch 126 forwards Ethernet frame 902 via the edge port coupling end device 148. End device 148 thus receives Ethernet frame 902 sent from end device 142 based on direct forwarding.

Exemplary Switch

Figure 10:
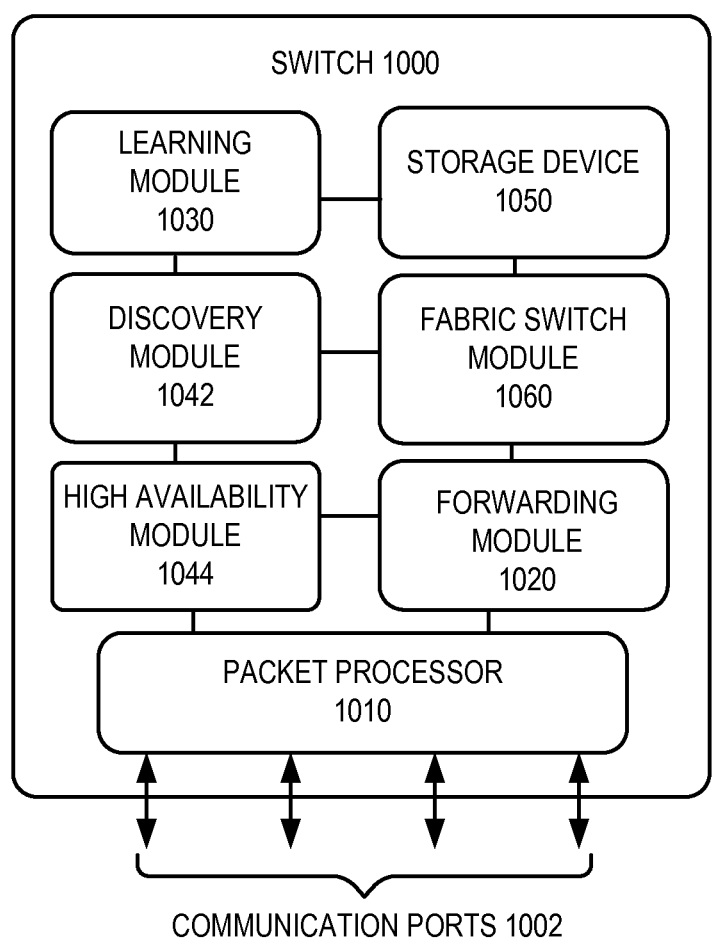
FIG. 10 illustrates an exemplary switch in an extended fabric switch, in accordance with an embodiment of the present invention.

FIG. 10 illustrates an exemplary switch in an extended fabric switch, in accordance with an embodiment of the present invention. In this example, a switch 1000 includes a number of communication ports 1002, a packet processor 1010, a learning module 1030, and a storage device 1050. Packet processor 1010 extracts and processes header information from the received frames.

In some embodiments, switch 1000 maintains a membership in a fabric switch, which can further be in an extended fabric switch, as described in conjunction with FIG. 1, wherein switch 1000 also includes a fabric switch module 1060. Fabric switch module 1060 maintains a configuration database in storage device 1050 that maintains the configuration state of every switch within the fabric switch. Fabric switch module 1060 maintains the state of the fabric switch, which is used to join other switches. In some embodiments, switch 1000 can be configured to operate in conjunction with a remote switch as an Ethernet switch.

Communication ports 1002 can include inter-switch communication channels for communication within the fabric switch. This inter-switch communication channel can be implemented via a regular communication port and based on any open or proprietary format. Communication ports 1002 can also include one or more extension communication ports for communication between neighbor fabric switches. Communication ports 1002 can include one or more TRILL ports capable of receiving frames encapsulated in a TRILL header. Communication ports 1002 can also include one or more IP ports capable of receiving IP packets. An IP port is capable of receiving an IP packet and can be configured with an IP address. Packet processor 1010 can process TRILL-encapsulated frames and/or IP packets.

During operation, learning module 1030 identifies from a notification message from a neighbor fabric switch a MAC address learned at the neighbor fabric switch and stores the MAC address in a local MAC table in association with the fabric IP address of the neighbor fabric switch. In some embodiments, switch 1000 can also include a discovery module 1042 which identifies a discovery message comprising the fabric IP address as a source IP address and, in response, includes the IP address in the neighbor list of the extended fabric switch. Switch 1000 can also include switch a high availability module 1044 which operates switch 1000 as an active forwarder of a VRRP forwarder for a virtual machine. This virtual machine has been migrated from a host machine coupled to the neighbor fabric switch to a host machine coupled to the local fabric switch, as described in conjunction with FIG. 7.

In some embodiments, switch 1000 also includes a forwarding module 1020 which identifies the MAC address as destination MAC address of a packet encapsulated in a fabric encapsulation header. In response, forwarding module 1020 encapsulates the packet (i.e., without the fabric encapsulation header) in a tunnel encapsulation header. Forwarding module 1020 also encapsulates an ARP request in a tunnel encapsulation header. Forwarding module 1020 can further encapsulate a packet destined to a virtual machine, which has been migrated to a neighbor fabric switch, in a tunnel encapsulation header, as described in conjunction with FIG. 6B.

In some embodiments, forwarding module 1020 identifies a packet encapsulated in a first tunnel encapsulation header corresponding to a tunnel between two hypervisors, as described in conjunction with FIG. 6A. Forwarding module 1020 can also identify a packet encapsulated in a fabric encapsulation header, as described in conjunction with FIG. 9. In either case, forwarding module 1020 encapsulates the encapsulated packet in a second tunnel encapsulation header corresponding to a tunnel mesh in the extended fabric switch.

Note that the above-mentioned modules can be implemented in hardware as well as in software. In one embodiment, these modules can be embodied in computer-executable instructions stored in a memory which is coupled to one or more processors in switch 1000. When executed, these instructions cause the processor(s) to perform the aforementioned functions.

In summary, embodiments of the present invention provide a switch and a method for extending fabric switches. In one embodiment, the switch includes a fabric switch module and a learning module. The fabric switch module maintains a membership in a first fabric switch. A fabric switch includes a plurality of switches and operates as a single switch. The first fabric switch is in an extended fabric switch which further comprises a second fabric switch. The learning module identifies from a notification message from the second fabric switch a MAC address learned at the second fabric switch. The learning module stores the MAC address in a local MAC table in association with an IP address of the second fabric switch.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
    a processor;
    fabric switch circuitry configured to maintain a membership in a first network of interconnected switches, wherein the first network of interconnected switches is identified by a first fabric identifier; and
    discovery circuitry configured to, in response to identifying an Internet Protocol (IP) address as a source address in a multicast discovery message, include the IP address in a neighbor list, wherein the neighbor list indicates that the IP address is associated with a second network of interconnected switches;
    learning circuitry configured to:
    identify, from a payload of a notification message from the second network of interconnected switches, a media access control (MAC) address learned at a second switch in the second network of interconnected switches, wherein a header of the notification message includes, the IP address as a source address, an Internet Protocol (IP) address indicating the second network of interconnected switches; and
    store a mapping relationship between the identified MAC address and the IP address in a local data structure; and
    forwarding circuitry configured to encapsulate a packet comprising the MAC address with a tunnel encapsulation header, wherein the tunnel encapsulation header includes the IP address as a destination IP address.

2. The switch of claim 1, wherein the IP address is a virtual IP address assigned to a plurality of member switches of the second network of interconnected switches.

3. The switch of claim 1, further comprising discovery circuitry configured to:
    identify a discovery message with the IP address as a source IP address, wherein the discovery message is a multicast message; and
    in response to identifying the discovery message, include the IP address in a neighbor list, wherein the neighbor list includes a respective IP address associated with indicating the first and or the second networks network of interconnected switches.

4. The switch of claim 1, wherein the forwarding circuitry is further configured to:
    identify the MAC address as a destination MAC address of the packet.

5. The switch of claim 4, wherein a source MAC address of the packet is associated with a first virtual machine running on a host machine reachable via the first network of interconnected switches;
    wherein the destination MAC address of the packet is associated with a second virtual machine running on a host machine reachable via the second network of interconnected switches; and
    wherein the first and second virtual machines are in a same virtual local area network (VLAN).

6. The switch of claim 1, wherein the forwarding circuitry is further configured to encapsulate an Address Resolution Protocol (ARP) request with a second tunnel encapsulation header, wherein a destination address of the second tunnel encapsulation header is the IP address.

7. The switch of claim 1, wherein the forwarding circuitry is further configured to encapsulate a second packet destined to a virtual machine with a second tunnel encapsulation header, wherein a destination address of the second tunnel encapsulation header is the IP address;
    wherein the virtual machine has been migrated from a first host machine reachable via the first network of interconnected switches to a second host machine reachable via the second network of interconnected switches.

8. The switch of claim 1, wherein the forwarding circuitry is further configured to:
    identify a second packet with a second tunnel encapsulation header, wherein a destination address of the second tunnel encapsulation header is assigned to a hypervisor; and
    encapsulate the second packet in a third tunnel encapsulation header, wherein a destination address of the third tunnel encapsulation header is the IP address.

9. The switch of claim 1, further comprising high availability circuitry configured to operate the switch as an active forwarder of an active-standby high availability protocol for a virtual machine;
    wherein the virtual machine has been migrated from a first host machine reachable via the second network of interconnected switches to a second host machine reachable via the first network of interconnected switches.

10. The switch of claim 1, wherein the forwarding circuitry is further configured to:
    identify a second packet with a fabric header, wherein an egress switch identifier of the fabric header is assigned to a member switch of the second network of interconnected switches; and
    encapsulate the second packet with a second tunnel encapsulation header, wherein a destination address of the second tunnel encapsulation header is the IP address.

11. The switch of claim 10, wherein the fabric header is based on one or more of:
    a Transparent Interconnection of Lots of Links (TRILL) protocol, wherein ingress and egress switch identifiers of the encapsulation header are TRILL routing bridge (RBridge) identifiers; and
    an Internet Protocol (IP), wherein source and destination addresses of the encapsulation header are IP addresses.

12. A method, comprising:
    maintaining a membership of a switch in a first network of interconnected switches, and wherein the first network of interconnected switches is identified by a first fabric identifier;
    in response to identifying an Internet Protocol (IP) address as a source address in a multicast discovery message, including the IP address in a neighbor list, wherein the neighbor list indicates that the IP address is associated with a second network of interconnected switches;
identifying, from a payload of a notification message from the second network of interconnected switches, a media access control (MAC) address learned at a second switch in the second network of interconnected switches, wherein a header of the notification message includes, the IP address as a source address, an Internet Protocol (IP) address indicating the second network of interconnected switches;
storing a mapping relationship between the identified MAC address and the IP address in a local data structure; and
encapsulating a packet comprising the MAC address with a tunnel encapsulation header, wherein the tunnel encapsulation header includes the IP address as a destination IP address.

13. The method of claim 12, wherein the IP address is a virtual IP address assigned to a plurality of member switches of the second network of interconnected switches.

14. The method of claim 12, further comprising:
identifying a discovery message with the IP address as a source IP address, wherein the discovery message is a multicast message; and
in response to identifying the discovery message, including the IP address in a neighbor list, wherein the neighbor list includes a respective IP address associated with indicating the first and or the second networks network of interconnected switches.

15. The method of claim 12, further comprising:
identifying the MAC address as a destination MAC address of the packet.

16. The method of claim 15, wherein a source MAC address of the packet is associated with a first virtual machine running on a host machine reachable via the first network of interconnected switches;
wherein the destination MAC address of the packet is associated with a second virtual machine running on a host machine reachable via the second network of interconnected switches; and
wherein the first and second virtual machines are in a same virtual local area network (VLAN).

17. The method of claim 12, further comprising encapsulating an Address Resolution Protocol (ARP) request with a second tunnel encapsulation header, wherein a destination address of the second tunnel encapsulation header is the IP address.

18. The method of claim 12, further comprising encapsulating a second packet destined to a virtual machine with a second tunnel encapsulation header, wherein a destination address of the second tunnel encapsulation header is the IP address;
wherein the virtual machine has been migrated from a first host machine coupled to the first network of interconnected switches to a second host machine coupled to the second network of interconnected switches.

19. The method of claim 12, further comprising:
identifying a second packet with a second tunnel encapsulation header, wherein a destination address of the second tunnel encapsulation header is assigned to a hypervisor; and
encapsulating the second packet with a third tunnel encapsulation header, wherein a destination address of the third tunnel encapsulation header is the IP address.

20. The method of claim 12, further comprising operating the switch as an active forwarder of an active-standby high availability protocol for a virtual machine;
wherein the virtual machine has been migrated from a first host machine coupled to the second network of interconnected switches to a second host machine coupled to the first network of interconnected switches.

21. The method of claim 12, further comprising:
identifying a second packet with a fabric header, wherein an egress switch identifier of the fabric header is assigned to a member switch of the second network of interconnected switches; and
encapsulating the second packet with a second tunnel encapsulation header, wherein a destination address of the second tunnel encapsulation header is the IP address.

22. The method of claim 21, wherein the fabric header is based on one or more of:
a Transparent Interconnection of Lots of Links (TRILL) protocol, wherein ingress and egress switch identifiers of the encapsulation header are TRILL routing bridge (RBridge) identifiers; and
an Internet Protocol (IP), wherein source and destination addresses of the encapsulation header are IP addresses.

23. A computer system, comprising:
a processor;
a storage device coupled to the processor and storing instructions which when executed by the processor cause the processor to perform a method, the method comprising:
maintaining a membership of a switch in a first network of interconnected switches, wherein the first network of interconnected switches is identified by a first fabric identifier;
in response to identifying an Internet Protocol (IP) address as a source address in a multicast discovery message, including the IP address in a neighbor list, wherein the neighbor list indicates that the IP address is associated with a second network of interconnected switches;
identifying, from a payload of a notification message from the second network of interconnected switches, a media access control (MAC) address learned at a second switch in the second network of interconnected switches, wherein a header of the notification message includes the IP address, as a source address, an Internet Protocol (IP) address indicating the second network of interconnected switches;
storing a mapping relationship between the identified MAC address and the IP address in a local data structure; and
encapsulating a packet comprising the MAC address with a tunnel encapsulation header, wherein the tunnel encapsulation header includes the IP address as a destination IP address.

24. A non-transitory computer-readable storage medium storing instructions that when executed by a computer cause the computer to perform a method, the method comprising:
maintaining a membership of a switch in a first network of interconnected switches;
in response to identifying an Internet Protocol (IP) address as a source address in a multicast discovery message, including the IP address in a neighbor list, wherein the neighbor list indicates that the IP address is associated with a second network of interconnected switches;

identifying, from a notification message from the second network of interconnected switches, a media access control (MAC) address learned at a second switch in the second network of interconnected switches, wherein a header of the notification message includes the IP address as a source address;

storing a mapping relationship between the identified MAC address and the IP address in a local data structure; and encapsulating a packet comprising the MAC address with a tunnel encapsulation header, wherein the tunnel encapsulation header includes the IP address as a destination IP address.

* * * * *